(12) United States Patent
Kim et al.

(10) Patent No.: US 12,393,236 B2
(45) Date of Patent: Aug. 19, 2025

(54) ANTENNAS AND ELECTRONIC DEVICE COMPRISING SAME

(71) Applicant: Samsung Electronics Co., Ltd., Suwon-si (KR)

(72) Inventors: Bomyoung Kim, Suwon-si (KR); Jinwoo Jung, Suwon-si (KR); Soonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 18/154,456

(22) Filed: Jan. 13, 2023

(65) Prior Publication Data

US 2023/0195186 A1   Jun. 22, 2023

Related U.S. Application Data

(63) Continuation of application No. PCT/KR2021/009477, filed on Jul. 22, 2021.

(30) Foreign Application Priority Data

Jul. 31, 2020  (KR) .................. 10-2020-0096206

(51) Int. Cl.
  *H01Q 1/24*  (2006.01)
  *G06F 1/16*  (2006.01)
  (Continued)

(52) U.S. Cl.
  CPC .......... *G06F 1/1698* (2013.01); *G06F 1/1641* (2013.01); *H01Q 1/243* (2013.01); *H01Q 1/38* (2013.01); *H01Q 1/48* (2013.01)

(58) Field of Classification Search
  CPC .... G06F 1/1698; G06F 1/1641; G06F 1/1652; H01Q 1/243; H01Q 1/38; H01Q 1/48;
  (Continued)

(56) References Cited

U.S. PATENT DOCUMENTS

| 7,602,342 B2 | 10/2009 | Schack et al. |
| 10,044,110 B2 | 8/2018 | Dong et al. |

(Continued)

FOREIGN PATENT DOCUMENTS

| EP | 2 403 060 A1 | 1/2012 |
| KR | 10-2017-0056292 | 5/2017 |

(Continued)

OTHER PUBLICATIONS

Korean Office Action dated Jul. 18, 2024, issued in Korean Application No. 10-2020-0096206.
(Continued)

*Primary Examiner* — David E Lotter
(74) *Attorney, Agent, or Firm* — Jefferson IP Law, LLP

(57) ABSTRACT

An electronic device is provided. The electronic device includes a first housing including first side and second sides facing opposite directions and a first lateral member surrounding a first space between the first and second sides, a second housing foldably connected to the first housing by a hinge, and including a third side facing a same direction as the first side in an unfolded state, a fourth side facing an opposite direction to the third side, and a second lateral member surrounding a second space between the third and fourth sides, a first bendable display extending from the first side to at least a portion of the third side, a second display visible through the fourth side and including a conductive plate on a rear surface thereof, an antenna disposed in the second housing, a wireless communication circuit electrically connected to the antenna through a first electrical path at a first point in the second space, and at least one conductive connection member disposed in the second space and connected to the ground. The conductive plate is electrically connected to ground at a second point spaced apart
(Continued)

from the first point through the at least one conductive connection member.

20 Claims, 31 Drawing Sheets

(51) Int. Cl.
*H01Q 1/38* (2006.01)
*H01Q 1/48* (2006.01)

(58) Field of Classification Search
CPC .. H01Q 5/314; H04M 1/0235; H04M 1/0268; H04M 1/026; H04M 1/0216; H04B 1/3827; H04B 1/50
See application file for complete search history.

(56) References Cited

U.S. PATENT DOCUMENTS

| | | | |
|---|---|---|---|
| 2011/0309998 A1* | 12/2011 | Sakurai | H01Q 1/48 343/906 |
| 2012/0154225 A1 | 6/2012 | Kanazawa | |
| 2014/0240178 A1 | 8/2014 | Chun et al. | |
| 2017/0110786 A1 | 4/2017 | Liu | |
| 2017/0142241 A1 | 5/2017 | Kim et al. | |
| 2018/0366813 A1 | 12/2018 | Kim et al. | |
| 2019/0007533 A1 | 1/2019 | Kim et al. | |
| 2019/0081410 A1* | 3/2019 | Zhou | H01Q 1/2258 |
| 2019/0103656 A1 | 4/2019 | Shi et al. | |
| 2020/0051468 A1 | 2/2020 | Jung et al. | |
| 2020/0060020 A1 | 2/2020 | Park et al. | |
| 2020/0119429 A1 | 4/2020 | Park et al. | |
| 2020/0136231 A1 | 4/2020 | Lee et al. | |
| 2020/0136243 A1 | 4/2020 | Shin et al. | |
| 2020/0245481 A1* | 7/2020 | Yoon | H01Q 1/44 |
| 2020/0333855 A1 | 10/2020 | Kim et al. | |
| 2020/0344336 A1* | 10/2020 | Li | H04M 1/0268 |
| 2021/0377372 A1 | 12/2021 | Jung et al. | |

FOREIGN PATENT DOCUMENTS

| | | |
|---|---|---|
| KR | 10-2019-0029442 A | 3/2019 |
| KR | 10-2060733 | 12/2019 |
| KR | 10-2020-0018282 | 2/2020 |
| KR | 10-2020-0031607 | 3/2020 |
| KR | 10-2020-0042611 | 4/2020 |
| KR | 10-2020-0046303 | 5/2020 |
| KR | 10-2020-0046399 | 5/2020 |

OTHER PUBLICATIONS

European Search Report dated Nov. 20, 2023, issued in European Application No. 21850948.7.

Indian Office Action dated Nov. 23, 2023, issued in Indian Application No. 202317005554.

* cited by examiner

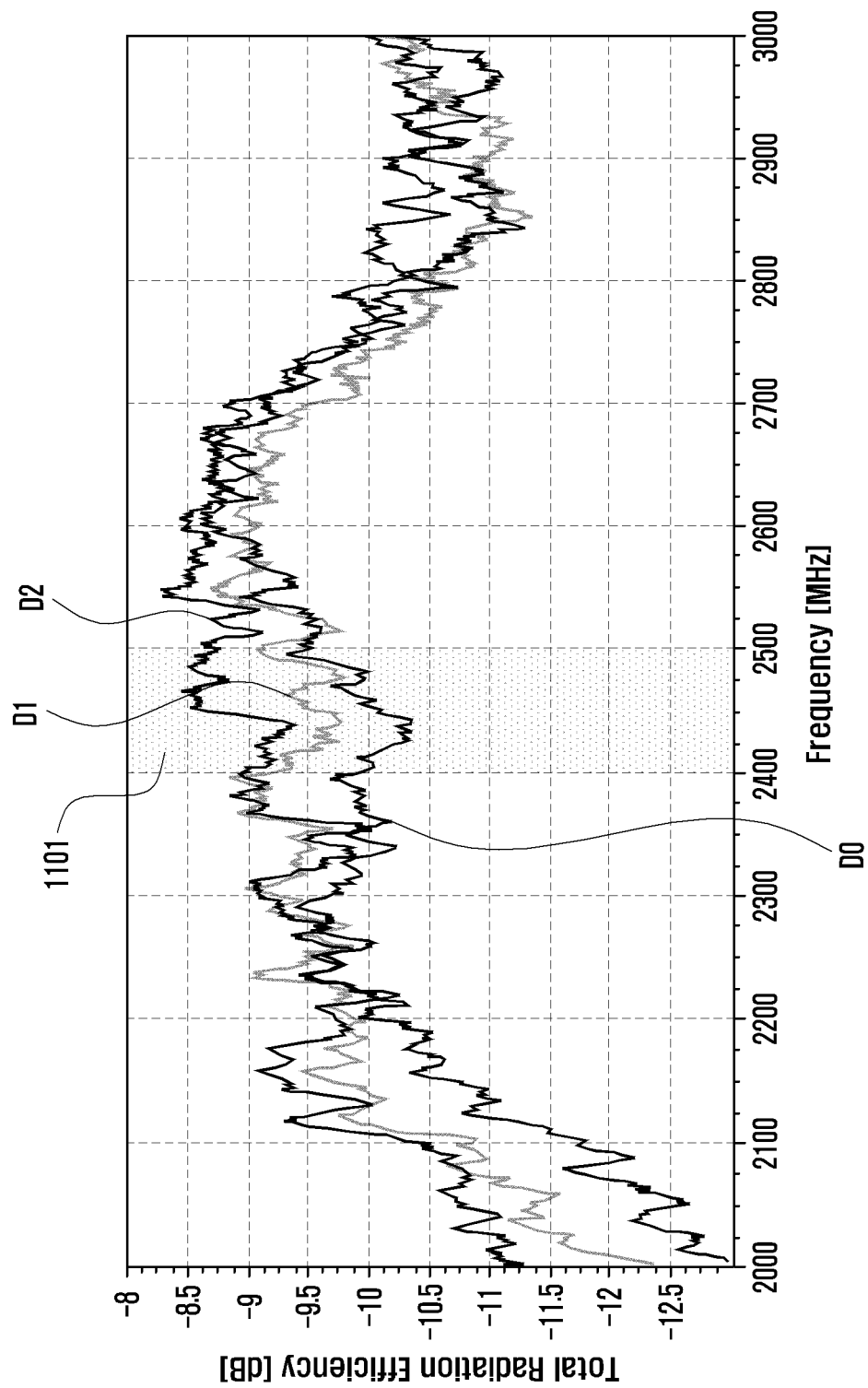

ANTENNAS AND ELECTRONIC DEVICE COMPRISING SAME

CROSS-REFERENCE TO RELATED APPLICATION(S)

This application is a continuation application, claiming priority under § 365(c), of an International application No. PCT/KR2021/009477, filed on Jul. 22, 2021, which is based on and claims the benefit of a Korean patent application number 10-2020-0096206, filed on Jul. 31, 2020, in the Korean Intellectual Property Office, the disclosure of each of which is incorporated by reference herein in its entirety.

BACKGROUND

1. Field

The disclosure relates to an antenna and an electronic device including the same.

2. Description of Related Art

As the functional gaps among electronic devices from each manufacturer have significantly narrowed, the electronic devices are gradually being slimmed in order to meet consumers' purchasing needs, and development is being conducted to strengthen the design aspect of the electronic devices and differentiate the functional elements of the electronic devices. As part of this trend, the electronic devices may include at least one antenna, which should be provided for communication among the components thereof, and development is being conducted so as to make the electronic devices exhibit excellent radiation performance through a structural change of the at least one antenna.

The above information is presented as background information only to assist with an understanding of the disclosure. No determination has been made, and no assertion is made, as to whether any of the above might be applicable as prior art with regard to the disclosure.

SUMMARY

The volume and number of antennas used (mounted) in a portable electronic device (a mobile electronic device, a portable terminal, or a mobile terminal) may be determined depending on the frequency, bandwidth, and/or type of each service. For example, a low band of about 700 megahertz (MHz) to 900 MHz, a mid-band of about 1700 MHz to 2100 MHz, a high band of about 2300 MHz to 2700 MHz, or a high frequency band of about 3 gigahertz (GHz) to 300 GHz (e.g., 5th generation (5G) new radio (NR)) may be used as a major communication band. As other examples, various wireless communication services (e.g., Bluetooth (BT), Global Positioning System (GPS), or Wi-Fi) may be used. In order to support the above-mentioned communication bands, it is necessary to include a plurality of antennas, but an electronic device may have a limited antenna volume space. In order to overcome this problem, service bands, which are similar to each other in terms of frequency bands, may be grouped with each other and designed to be split to several antennas.

For example, antennas may operate in various frequency bands such as 2nd generation (2G) bands (e.g., global system for mobile communication (GSM) 850, Extended global system for mobile communication (EGSM), distributed control system (DCS), and process control system (PCS)), wideband code division multiple access (WCDMA) bands (e.g., B1, B2, B5, and B8), long term evolution (LTE) bands (e.g., B1, B2, B3, B4, B5, B7, B8, B12, B17, B18, B19, B20, B26, B38, B39, B40, and B41) and/or Sub-6 bands (e.g., n77, n78, and n79). When these antennas are individually implemented to operate in all frequency bands supported by electronic devices, it may be difficult to achieve the satisfaction of service provider specifications, the satisfaction of specific absorption rate (SAR) standards, the minimization of the impact on human body, and/or the like. Thus, one antenna may be implemented to operate in a plurality of frequency bands.

The electronic devices may include a foldable electronic device including a first housing and a second housing foldably connected to the first housing via a hinge device. The foldable housing may include a first display (e.g., a flexible display) disposed to be used in an unfolded state and supported by at least a portion of the second housing via the hinge device from the first housing. The foldable housing may include a second display (e.g., a sub-display) that is used in a folded state and is disposed on the first housing or the second housing to face the opposite direction to the first display. The foldable electronic device may include an antenna disposed in an inner space of the first housing and/or the second housing or using at least a portion of the conductive side surfaces of the first housing and/or the second housing.

However, when the antenna is disposed between and/or near the first display and the second display, nulls may be generated by the first display or the second display, and the radiation performance of the antenna may be degraded. In a rollable type (e.g., a slidable type) electronic device as well, when an antenna is disposed between and/or near a bending area of a flexible display, the radiation performance of the antenna may be degraded.

Aspects of the disclosure are to address at least the above-mentioned problems and/or disadvantages and to provide at least the advantages described below. Accordingly, an aspect of the disclosure is to provide an antenna configured to exhibit excellent radiation performance even when disposed around a display and an electronic device including the antenna.

Additional aspects will be set forth in part in the description which follows and, in part, will be apparent from the description, or may be learned by practice of the presented embodiments.

In accordance with an aspect of the disclosure, an electronic device is provided. The electronic device includes a first housing including a first surface, a second surface facing an opposite direction to the first surface, and a first lateral member surrounding a first space between the first surface and the second surface, a second housing foldably connected to the first housing via a hinge device and including a third surface and a fourth surface, which, in an unfolded state, face the same direction as the first surface and an opposite direction to the third surface, respectively, and a second lateral member surrounding a second space between the third surface and the fourth surface, a first display extending from the first surface to at least a portion of the third surface and disposed to be bendable, a second display disposed to be visible from the outside through the fourth surface and including a conductive plate on a rear surface thereof, an antenna disposed in the second housing, a wireless communication circuit electrically connected to the antenna via a first electrical path at a first point in the second space, and at least one conductive connection member disposed in the second space and electrically connected to the ground. The conductive plate may be electrically connected to the ground at a second point spaced apart from the first point via the conductive connection member.

In accordance with another aspect of the disclosure, an electronic device is provided. The electronic device includes a housing including a first surface and a second surface facing an opposite direction to the first surface, a first display disposed in an inner space of the housing to be visible from the outside through the first surface, a second display that at least partially overlaps the first display when viewed from above, the second display including a conductive plate on a rear surface thereof and being disposed to be visible from the outside through the second surface, an antenna disposed in and/or near an overlapping space between the first display and the second display, a wireless communication circuit electrically connected to the antenna via a first electrical path at a first point in the inner space, and at least one conductive connection member disposed in the inner space of the housing and connected to a ground. The conductive plate may be electrically connected to the ground at a second point spaced apart from the first point via the at least one conductive connection member.

An antenna structure according to an embodiment of the disclosure may be helpful for overcoming performance deterioration, generation of additional resonance, or mitigation of the null area of an antenna through electrical connection between a conductive plate of a display and a conductive structure used as a common ground within a predetermined distance from a feeding position of the antenna disposed in the vicinity of the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the drawings, in which:

FIG. 11D is a graph illustrating, in comparison, frequency characteristics of an antenna obtained through a variable circuit according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
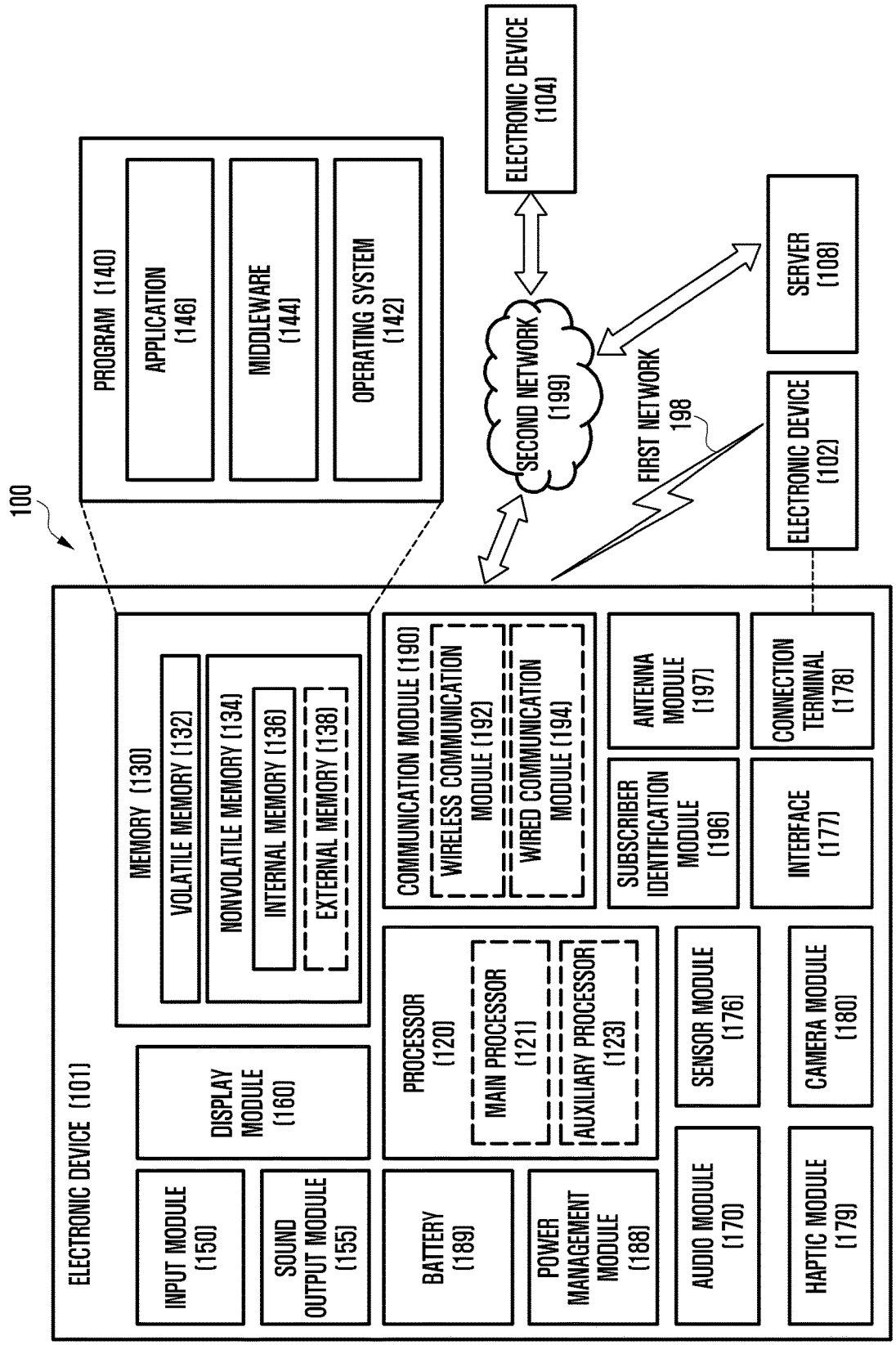
FIG. 1 is a block diagram of an electronic device in a network environment according to an embodiment of the disclosure.

FIG. 1 illustrates a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The nonvolatile memory 134 may include internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
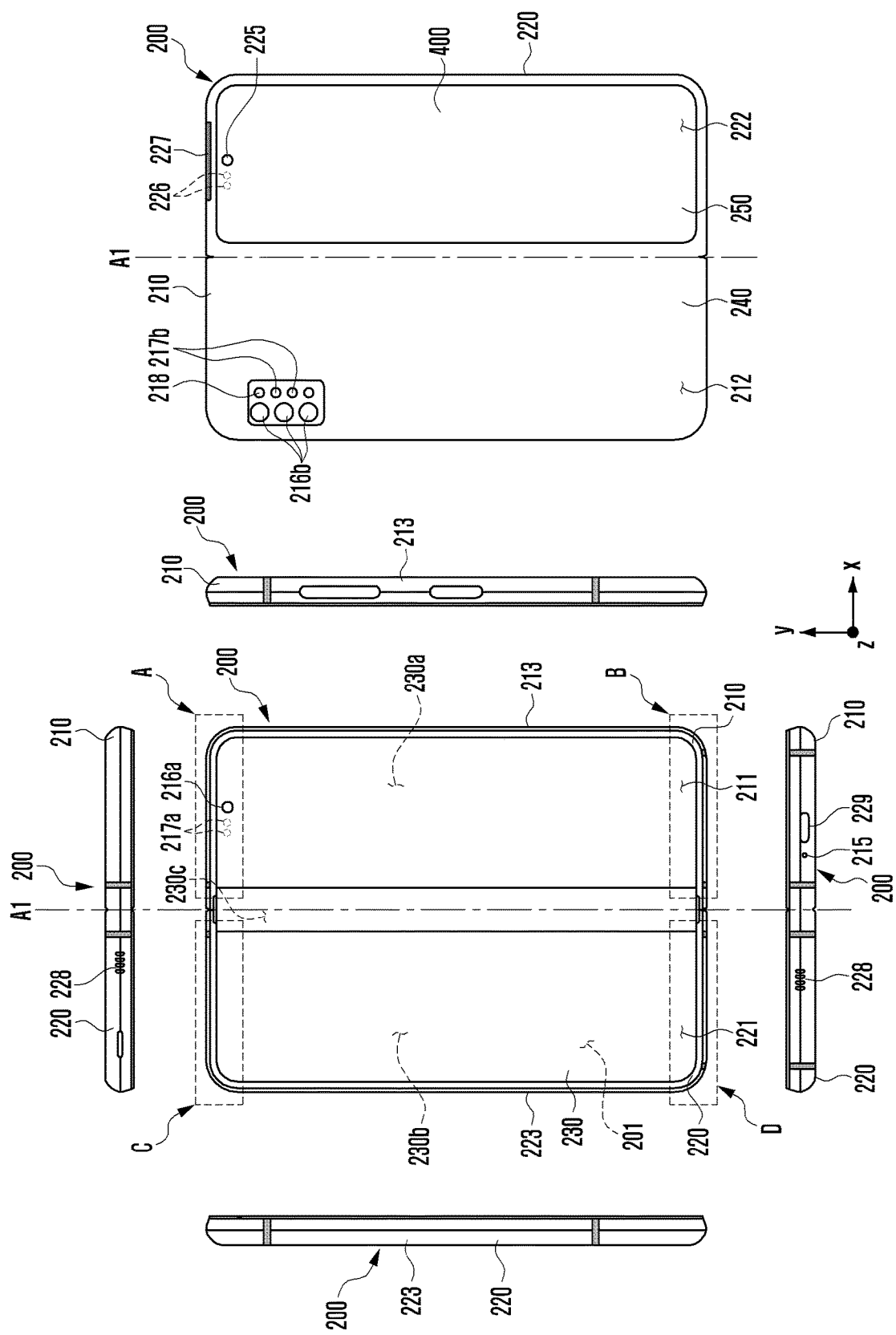
FIG. 2A is a view illustrating an electronic device 200 in the unfolded stage according to an embodiment of the disclosure.

FIG. 2A is a diagram illustrating an unfolded state of an electronic device 200 according to an embodiment of the disclosure.

Figure 2B:
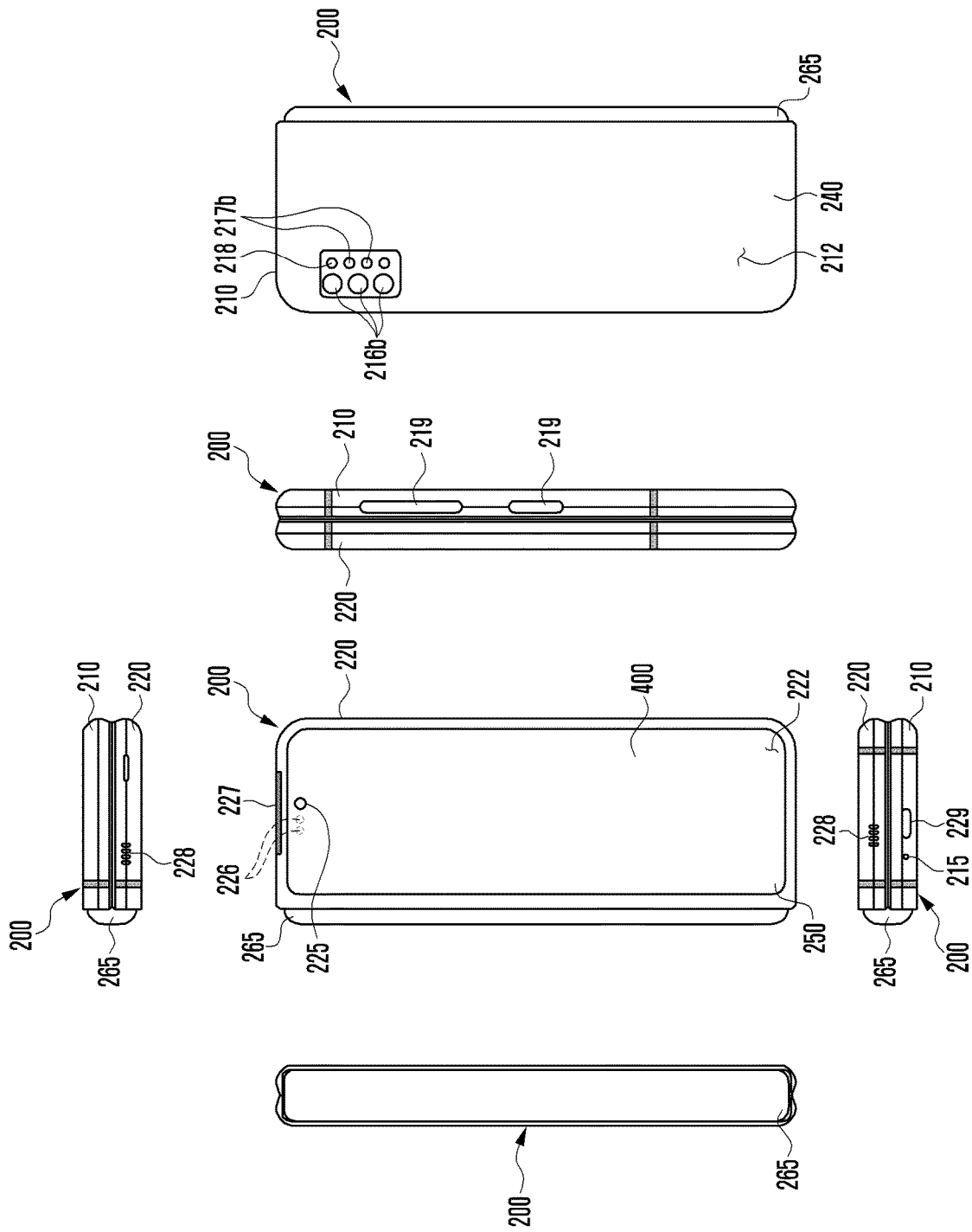
FIG. 2B is a view illustrating the electronic device 200 of FIG. 2A in the folded state according to an embodiment of the disclosure.

FIG. 2B is a diagram illustrating a folded state of the electronic device 200 of FIG. 2A according to an embodiment of the disclosure.

Referring to FIGS. 2A and 2B, the electronic device 200 may include a pair of housings 210 and 220 (e.g., foldable housing) rotatably coupled based on a folding axis A1 through a hinge device (e.g., a hinge device 264 of FIG. 3) to be foldable with respect to each other, a first display 230 (e.g., flexible display, foldable display, or main display) disposed through the pair of housings 210 and 220, and/or a second display 400 (e.g., sub-display) disposed through the second housing 220. According to certain embodiments, at least a portion of the hinge device (e.g., the hinge device 264 of FIG. 3) may be disposed to not be visible from the outside through the first housing 210 and the second housing 220 and disposed to not be visible from the outside through a hinge cover 265 covering a foldable portion in an unfolded state. In this document, a surface in which the first display 230 is disposed may be defined as a front surface of the electronic device 200, and an opposite surface of the front surface may be defined as a rear surface of the electronic device 200. Further, a surface enclosing a space between the front surface and the rear surface may be defined as a side surface of the electronic device 200.

Figure 3:
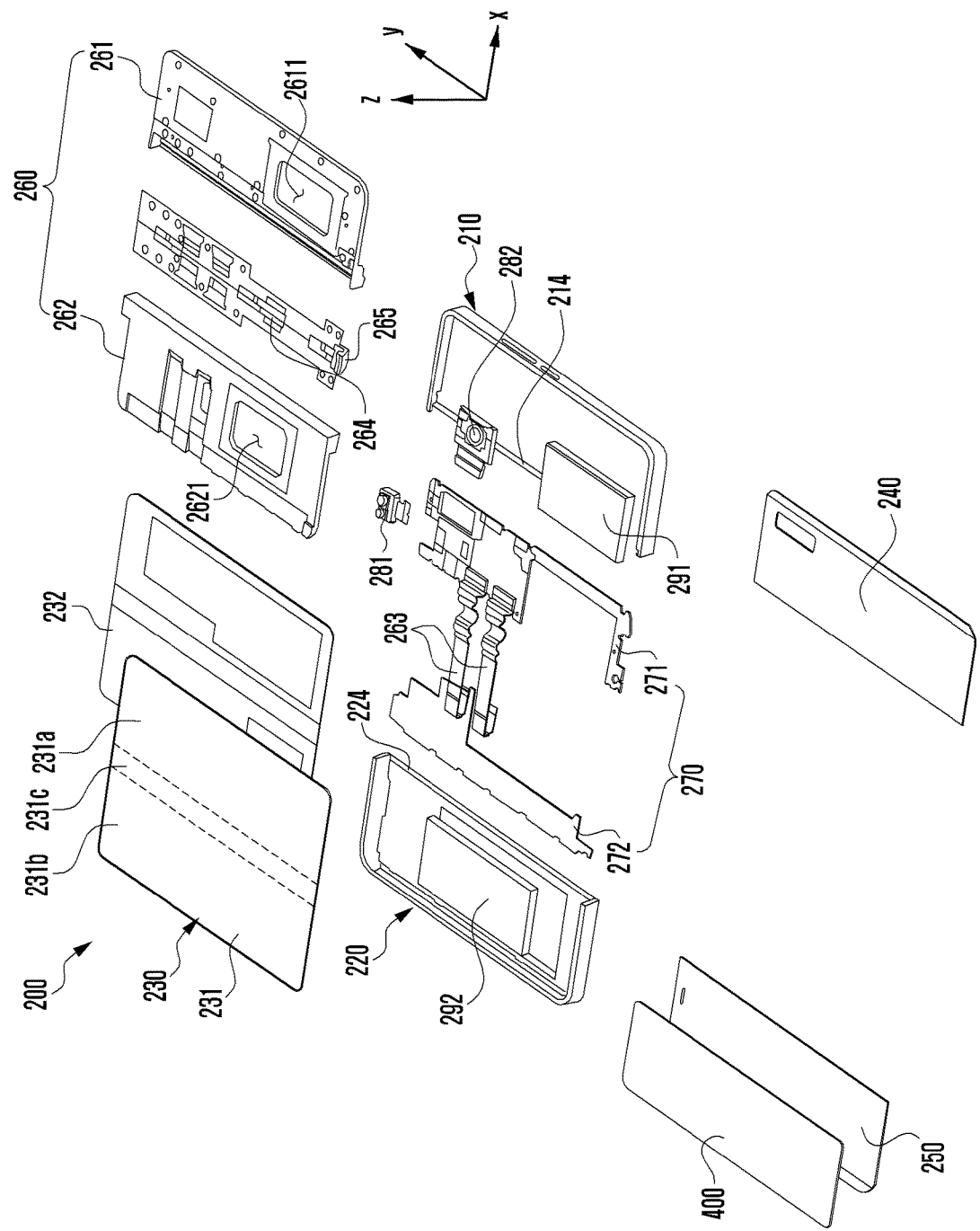
FIG. 3 is an exploded perspective view of the electronic device 200 according to an embodiment of the disclosure.

According to various embodiments, the pair of housings 210 and 220 may include a first housing 210 and second housing 220 disposed to be foldable with respect to each other through the hinge device (e.g., the hinge device 264 of FIG. 3). According to certain embodiments, the pair of housings 210 and 220 are not limited to the shape and coupling illustrated in FIGS. 2A and 2B, and may be implemented by a combination and/or coupling of other shapes or parts. According to certain embodiments, the first housing 210 and the second housing 220 may be disposed at both sides based on the folding axis A1, and have an overall symmetrical shape with respect to the folding axis A1. According to some embodiments, the first housing 210 and the second housing 220 may be folded asymmetrically based on the folding axis A1. According to certain embodiments, the first housing 210 and the second housing 220 may have different angles or distances from each other according to whether the electronic device 200 is in an unfolded state, a folded state, or an intermediate state.

According to various embodiments, when the electronic device 200 is in an unfolded state, the first housing 210 may include a first surface 211 connected to the hinge device (e.g., the hinge device 264 of FIG. 3) and disposed to face the front of the electronic device 200, a second surface 212 facing in a direction opposite to that of the first surface 211, and/or a first lateral member 213 enclosing at least a portion of a first space between the first surface 211 and the second surface 212. According to certain embodiments, when the electronic device 200 is in an unfolded state, the second housing 220 may include a third surface 221 connected to the hinge device (e.g., the hinge device 264 of FIG. 3), and disposed to face the front of the electronic device 200, a fourth surface 222 facing in a direction opposite that of the third surface 221, and/or a second lateral member 223 enclosing at least a portion of a second space between the third surface 221 and the fourth surface 222. According to certain embodiments, the first surface 211 may face in substantially the same direction as that of the third surface 221 when the electronic device is in an unfolded state and at least partially face the third surface 221 when the electronic device is in a folded state. According to certain embodiments, the electronic device 200 may include a recess 201 formed to receive the first display 230 through structural coupling of the first housing 210 and the second housing 220. According to certain embodiments, the recess 201 may have substantially the same size as that of the first display 230.

According to various embodiments, the hinge cover 265 (e.g., hinge cover) may be disposed between the first housing 210 and the second housing 220 and be disposed to cover a hinge device (e.g.: the hinge device 264 of FIG. 3) disposed in the hinge cover 265. According to certain embodiments, the hinge cover 265 may be covered by a part of the first housing 210 and the second housing 220 or may be exposed to the outside according to an unfolded state, a folded state, or an intermediate state of the electronic device 200. For example, when the electronic device 200 is in an unfolded state, at least a portion of the hinge cover 265 may be covered by the first housing 210 and the second housing 220 to not be substantially exposed. According to certain embodiments, when the electronic device 200 is in a folded state, at least a portion of the hinge cover 265 may be exposed to the outside between the first housing 210 and the second housing 220. According to certain embodiments, when the first housing 210 and the second housing 220 are in an intermediate state folded with a certain angle, the hinge cover 265 may be at least partially exposed to the outside of the electronic device 200 between the first housing 210 and the second housing 220. For example, an area in which the hinge cover 265 is exposed to the outside may be smaller than that in a fully folded state. According to certain embodiments, the hinge cover 265 may include a curved surface.

According to various embodiments, when the electronic device 200 is in an unfolded state (e.g., the state of FIG. 2A), the first housing 210 and the second housing 220 form an angle of approximately 180 degrees, and a first area 230a, a folding area 230c, and a second area 230b of the first display 230 may form the same flat surface and be disposed to face in substantially the same direction. In another embodiment, when the electronic device 200 is in an unfolded state, the first housing 210 may rotate at an angle of approximately 360 degrees with respect to the second housing 220 so that the second surface 212 and the fourth surface 222 may be reversely folded to face each other (out-folding method).

According to various embodiments, when the electronic device 200 is in the folded state (e.g., the state of FIG. 2B), the first surface 211 of the first housing 210 and the third surface 221 of the second housing 220 may be disposed to face each other. In this case, the first area 230a and the second area 230b of the first display 230 may form a narrow angle (e.g., a range of 0 degree to approximately 10 degree) each other through the folding area 230c and be disposed to face each other. According to certain embodiments, at least a portion of the folding area 230c may be transformed into a curved shape having a predetermined curvature. According to certain embodiments, when the electronic device 200 is in an intermediate state, the first housing 210 and the second housing 220 may be disposed at a certain angle to each other. In this case, the first area 230a and the second area 230b of the first display 230 may form an angle larger than the folded state and smaller than the unfolded state, and a curvature of the folding area 230c may be smaller than that of the folded state and be larger than that of the unfolded state. In some embodiments, the first housing 210 and the second housing 220 may form an angle that may stop at a specified folding angle between the folded state and the unfolded state through the hinge device (e.g., the hinge device 264 of FIG. 3) (free stop function). In some embodiments, the first housing 210 and the second housing 220 may be operated while being pressurized in an unfolding direction or a folding direction based on a specified inflection angle through the hinge device (e.g., the hinge device 264 of FIG. 3).

According to various embodiments, the electronic device 200 may include at least one of at least one display 230 and 400, an input device 215, sound output devices 227 and 228, sensor modules 217a, 217b, and 226, camera modules 216a, 216b, and 225, a key input device 219, an indicator, or a connector port 229 disposed in the first housing 210 and/or the second housing 220. In some embodiments, the electronic device 200 may omit at least one of the components or may additionally include at least one other component.

According to various embodiments, the at least one display 230 and 400 may include a first display 230 (e.g., flexible display) disposed to receive support from the third surface 221 of the second housing 220 through the hinge device (e.g., the hinge device 264 of FIG. 3) from the first surface 211 of the first housing 210, and a second display 400 disposed to be visible at least partially from the outside through the fourth surface 222 in an inner space of the second housing 220. As another example, the second display 400 may be disposed to be visible from the outside through the second surface 212 in an inner space of the first housing 210. According to certain embodiments, the first display 230 may be mainly used in an unfolded state of the electronic device 200, and the second display 400 may be mainly used in a folded state of the electronic device 200. According to certain embodiments, when the electronic device 200 is in an intermediate state, the electronic device 200 may control the first display 230 and/or the second display 400 to be usable based on a folding angle of the first housing 210 and the second housing 220.

According to various embodiments, the first display 230 may be disposed in a receiving space formed by a pair of housings 210 and 220. For example, the first display 230 may be disposed in the recess 201 formed by the pair of housings 210 and 220, and when the electronic device 200 is in an unfolded state, the first display 230 may be disposed to occupy substantially most of the front surface of the electronic device 200. According to certain embodiments, the first display 230 may include a flexible display of which at least a partial area may be transformed into a flat surface or a curved surface. According to certain embodiments, the first display 230 may include a first area 230a facing the first housing 210, a second area 230b facing the second housing 220, and a folding area 230c connecting the first area 230a and the second area 230b and facing the hinge device (e.g., the hinge device 264 of FIG. 3). According to certain embodiments, area division of the first display 230 is a physical division by a pair of housings 210 and 220 and the hinge device (e.g., the hinge device 264 of FIG. 3), and the first display 230 may be displayed as a substantially seamless single full screen through the pair of housings 210 and 220 and the hinge device (e.g., the hinge device 264 of FIG. 3). According to certain embodiments, the first area 230a and the second area 230b may have an overall symmetrical shape or a partially asymmetrical shape based on the folding area 230c.

According to various embodiments, the electronic device 200 may include a first rear cover 240 disposed at the second surface 212 of the first housing 210 and a second rear cover 250 disposed at the fourth surface 222 of the second housing 220. In some embodiments, at least a portion of the first rear cover 240 may be integrally formed with the first lateral member 213. In some embodiments, at least a portion of the second rear cover 250 may be integrally formed with the second lateral member 223. According to certain embodiments, at least one cover of the first rear cover 240 and the second rear cover 250 may be formed with a substantially transparent plate (e.g., a polymer plate or a glass plate including various coating layers) or an opaque plate. According to certain embodiments, the first rear cover 240 may be formed by an opaque plate such as, for example, coated or tinted glass, ceramic, polymer, metal (e.g., aluminum, stainless steel (STS), or magnesium), or a combination of at least two of the above materials. According to certain embodiments, the second rear cover 250 may be formed through a substantially transparent plate such as glass or polymer, for example. Accordingly, the second display 400 may be disposed to be visible from the outside through the second rear cover 250 in an inner space of the second housing 220.

According to various embodiments, the input device 215 may include a microphone. In some embodiments, the input device 215 may include a plurality of microphones disposed to detect a direction of a sound. According to certain embodiments, the sound output devices 227 and 228 may include speakers. According to certain embodiments, the sound output devices 227 and 228 may include a call receiver 227 disposed through the fourth surface 222 of the second housing 220 and an external speaker 228 disposed through at least a portion of the second lateral member 223 of the second housing 220. In some embodiments, the input device 215, the sound output devices 227 and 228, and the connector 229 may be disposed in spaces of the first housing 210 and/or the second housing 220 and be exposed to an external environment through at least one hole formed in the first housing 210 and/or the second housing 220. In some embodiments, holes formed in the first housing 210 and/or the second housing 220 may be commonly used for the input device 215 and the sound output devices 227 and 228. In some embodiments, the sound output devices 227 and 228 may include a speaker (e.g., piezo speaker) operating while excluding a hole formed in the first housing 210 and/or the second housing 220.

According to various embodiments, the camera modules 216a, 216b, and 225 may include a first camera module 216a disposed at the first surface 211 of the first housing 210, a second camera module 216b disposed at the second surface 212 of the first housing 210, and/or a third camera module 225 disposed at the fourth surface 222 of the second housing 220. According to certain embodiments, the electronic device 200 may include a flash 218 disposed near the second camera module 216b. According to certain embodiments, the flash 218 may include, for example, a light emitting diode or a xenon lamp. According to certain embodiments, the camera modules 216a, 216b, and 225 may include one or a plurality of lenses, an image sensor, and/or an image signal processor. In some embodiments, at least one camera module of the camera modules 216a, 216b, and 225 may include two or more lenses (e.g., wide-angle and telephoto lenses) and image sensors and be disposed together at any one surface of the first housing 210 and/or the second housing 220.

According to various embodiments, the sensor modules 217a, 217b, and 226 may generate an electrical signal or a data value corresponding to an internal operating state of the electronic device 200 or an external environmental state. According to certain embodiments, the sensor modules 217a, 217b, and 226 may include a first sensor module 217a disposed at the first surface 211 of the first housing 210, a second sensor module 217b disposed at the second surface 212 of the first housing 210, and/or a third sensor module 226 disposed at the fourth surface 222 of the second housing 220. In some embodiments, the sensor modules 217a, 217b, and 226 may include at least one of a gesture sensor, a grip sensor, a color sensor, an infrared (IR) sensor, an illuminance sensor, an ultrasonic sensor, an iris recognition sensor, or a distance detection sensor (e.g., time of flight (TOF) sensor or light detection and ranging (LiDAR)).

According to various embodiments, the electronic device 200 may further include a sensor module, for example, at least one of an atmospheric pressure sensor, a magnetic sensor, a biometric sensor, a temperature sensor, a humidity sensor, or a fingerprint recognition sensor. In some embodiments, the fingerprint recognition sensor may be disposed through at least one of the first lateral member 213 of the first housing 210 and/or the second lateral member 223 of the second housing 220.

According to various embodiments, the key input device 219 may be disposed to be exposed to the outside through the first lateral member 213 of the first housing 210. In some embodiments, the key input device 219 may be disposed to be exposed to the outside through the second lateral member 223 of the second housing 220. In some embodiments, the electronic device 200 may not include some or all of the key input devices 219, and the non-included key input devices 219 may be implemented into other forms such as soft keys on at least one display 230 and 400. As another embodiment, the key input device 219 may be implemented using a pressure sensor included in at least one display 230 and 400.

According to various embodiments, the connector port 229 may include a connector (e.g., USB connector or interface connector port module (IF module)) for transmitting and receiving power and/or data to and from an external electronic device. In some embodiments, the connector port 229 may further include a separate connector port (e.g., ear jack hole) for performing together a function for transmitting and receiving an audio signal to and from an external electronic device or for performing a function of transmitting and receiving an audio signal.

According to various embodiments, at least one camera module 216a and 225 of the camera modules 216a, 216b, and 225, at least one sensor module 217a and 226 of the sensor modules 217a, 217b, and 226, and/or the indicator may be disposed to be exposed through at least one display 230 and 400. For example, the at least one camera module 216a and 225, the at least one sensor module 217a and 226, and/or the indicator may be disposed under a display area of the displays 230 and 400 in an interior space of the at least one housing 210 and 220 and be disposed to contact an external environment through an opening or transparent area perforated to a cover member (e.g., a window layer of the first display 230 and/or the second rear cover 250). According to certain embodiments, an area in which the displays 230 and 400 and the at least one camera module 216a and 225 face each other is a part of an area displaying contents and may be formed as a transmission area having predetermined transmittance. According to certain embodiments, the transmission area may be formed to have transmittance in a range from approximately 5% to approximately 20%. Such a transmission area may include an area overlapped with an effective area (e.g., view angle area) of the at least one camera module 216a and 225 through which light for generating an image by an image sensor passes. For example, the transmission area of the displays 230 and 400 may include an area having a lower pixel density than that of a peripheral area thereof. For example, the transmission area may replace the opening. For example, the at least one camera module 216a and 225 may include an under display camera (UDC). In another embodiment, some camera modules or sensor modules 217a and 226 may be disposed to perform functions thereof without being visually exposed through the display. For example, an area facing the camera modules 216a and 225 and/or the sensor modules 217a and 226 disposed under the displays 230 and 400 (e.g., display panel) has an under display camera (UDC) structure; thus, a perforated opening may be unnecessary.

According to various embodiments, the electronic device 200 may include at least one antenna configured with at least a portion of the first lateral member 213 of the first housing 210. According to an embodiment, the at least one antenna may be disposed in an upper area (e.g., area A) and/or a lower area (e.g., area B) of the first housing 210.

According to an embodiment of the disclosure, at least one antenna may be additionally implemented by using the second lateral member 223 of the second housing 220 including the second display 400. According to an embodiment, at least one antenna may be additionally disposed in the upper area (area C) and/or the lower area (area D) of the second lateral member 223. In this case, a conductive sheet (e.g., the conductive sheet 444 of FIG. 4) of the second display 400 and a peripheral conductive structure (e.g., a substrate or a conductive electrical structure) used as a common ground may be electrically connected (grounded) to each other at at least one predetermined position in the vicinity of a feeding point of an antenna, which may be helpful to prevent deterioration in radiation performance of the antenna using the second lateral member 223.

FIG. 3 is an exploded perspective view illustrating an electronic device 200 according to an embodiment of the disclosure.

Referring to FIG. 3, the electronic device 200 may include a first display 230, a second display 400, a hinge device 264, a support member assembly 260, at least one printed circuit board 270, a first housing 210, a second housing 220, a first rear cover 240, and/or a second rear cover 250.

According to various embodiments, the first display 230 may include a display panel 231 (e.g., flexible display panel) and one or more plates 232 or layers in which the display panel 231 is seated. According to certain embodiments, the display panel 231 may include a first panel area 231a corresponding to the first area (e.g., the first area 230a of FIG. 2A) of the display 230, a second panel area 231b extended from the first panel area and corresponding to the second area (e.g., the second area 230b of FIG. 2A) of the display 230, and a third area 231c connecting the first panel area 231a and the second panel area 231b and corresponding to a folding area (e.g., the folding area 230c of FIG. 2A) of the display 230. According to certain embodiments, the one or more plates 232 may include a conductive plate (e.g., a copper (Cu) sheet or steel use stainless (SUS) sheet) disposed between the display panel 231 and the support member assembly 260. According to certain embodiments, the one or more plates 232 may be formed to have substantially the same area as that of the first display 230, and an area facing a folding area (e.g., the folding area 230c of FIG. 2A) of the first display 230 may be formed to be bendable. According to certain embodiments, the one or more plates 232 may include at least one auxiliary material layer (e.g., graphite member) disposed at a rear surface of the display panel 231. According to certain embodiments, the one or more plates 232 may be formed in a shape corresponding to the display panel 231.

According to various embodiments, the second display 400 may be disposed in a space between the second housing 220 and the second rear cover 250. According to certain embodiments, the second display 400 may be disposed to be visible from the outside through substantially the entire area of the second rear cover 250 in a space between the second housing 220 and the second rear cover 250.

According to various embodiments, the support member assembly 260 may include a first support member 261 (e.g., first support plate) and a second support member 262 (e.g., second support plate). According to certain embodiments, the first support member 261 may be foldably coupled to the second support member 262 through the hinge device 264. According to certain embodiments, the electronic device 200 may include at least one wiring member 263 (e.g., flexible printed circuit board (FPCB)) disposed from at least a portion of the first support member 261 across the hinge device 264 to a portion of the second support member 262. According to certain embodiments, the support member assembly 260 may be disposed between one or more plates 232 and at least one printed circuit board 270. According to certain embodiments, the first support member 261 may be disposed between the first area (e.g., the first area 230a of FIG. 2A) of the first display 230 and a first printed circuit board 271. According to certain embodiments, the second support member 262 may be disposed between the second area (e.g., the second area 230b of FIG. 2A) of the first display 230 and a second printed circuit board 272. According to certain embodiments, the at least one wiring member 263 and/or at least a portion of the hinge device 264 may be disposed to be supported through at least a portion of the support member assembly 260. According to certain embodiments, the at least one wiring member 263 may be disposed in a direction (e.g., x-axis direction) crossing the first support member 261 and the second support member 262. According to certain embodiments, the at least one wiring member 263 may be disposed in a direction (e.g., the x-axis direction) substantially perpendicular to the folding axis (e.g., the y-axis or the folding axis A1 of FIG. 2A) of the folding area 230c.

According to various embodiments, the at least one printed circuit board 270 may include a first printed circuit board 271 disposed to face the first support member 261 or a second printed circuit board 272 disposed to face the second support member 262. According to certain embodiments, the first printed circuit board 271 and the second printed circuit board 272 may be disposed in an inner space formed by the support member assembly 260, the first housing 210, the second housing 220, and the first rear cover 240, and/or the second rear cover 250. According to certain embodiments, the first printed circuit board 271 and the second printed circuit board 272 may include a plurality of electronic components disposed to implement various functions of the electronic device 200.

According to various embodiments, the electronic device 200 may include a first printed circuit board 271 disposed in a first space of the first housing 210, a first battery 291 disposed at a position facing a first swelling hole 2611 of the first support member 261, at least one camera module 282 (e.g., the first camera module 216a and/or the second camera module 216b of FIG. 2A), or at least one sensor module 281 (e.g., the first sensor module 217a and/or the second sensor module 217b of FIG. 2A). According to certain embodiments, the electronic device 200 may include a second printed circuit board 272 disposed in the second space of the second housing 220 or a second battery 292 disposed in a position facing a second swelling hole 2621 of the second support member 262. According to certain embodiments, the first housing 210 may be integrally formed with the first support member 261. According to certain embodiments, the second housing 220 may be integrally formed with the second support member 262.

According to various embodiments, the first housing 210 may include a first rotation support surface 214, and the second housing 220 may include a second rotation support surface 224 corresponding to the first rotation support surface 214. According to certain embodiments, the first rotation support surface 214 and the second rotation support surface 224 may include curved surfaces corresponding to (naturally connected to) a curved outer surface of the hinge cover 265. According to certain embodiments, when the electronic device 200 is in an unfolded state, the first rotation support surface 214 and the second rotation support surface 224 may cover the hinge cover 265, thereby not exposing the hinge cover 265 from the rear surface of the electronic device 200 or exposing only a portion thereof. According to certain embodiments, when the electronic device 200 is in a folded state, the first rotation support surface 214 and the second rotation support surface 224 may rotate along the curved outer surface of the hinge cover 265 to expose at least a portion of the hinge cover 265 to the rear surface of the electronic device 200.

Figure 4:
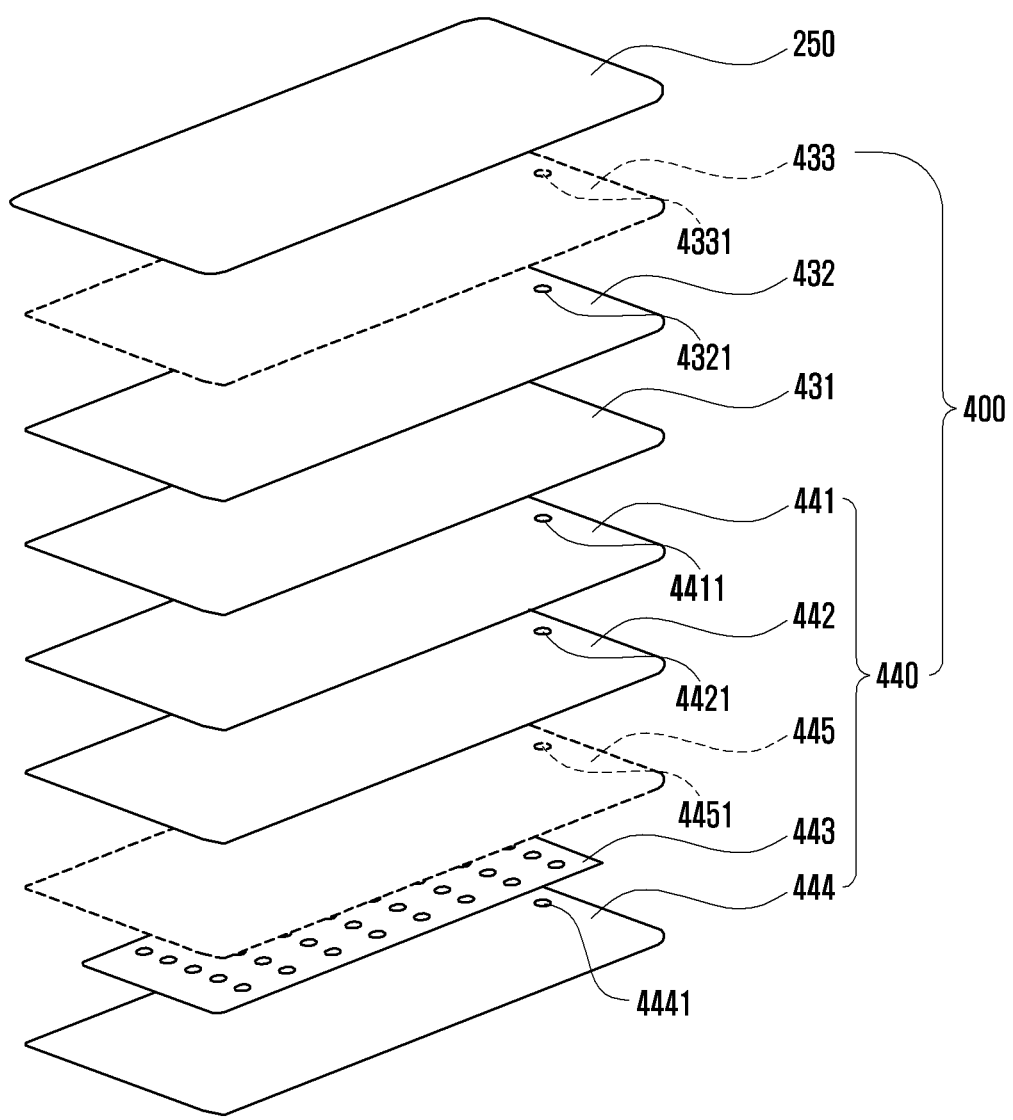
FIG. 4 is an exploded perspective view of a second display 400 according to an embodiment of the disclosure.

FIG. 4 is an exploded perspective view of the second display 400 according to an embodiment of the disclosure.

Referring to FIG. 4, the second display 400 may include a polarizer (e.g., POL) 432 (e.g., a polarizing film) disposed on the rear surface of the second rear surface cover (e.g., the second rear surface cover 250 in FIG. 2A), a display panel 431, or one or more subsidiary material layers 440 attached to the rear surface of the display panel 431. According to an embodiment, the adhesive member may include an optical clear adhesive (OCA), a pressure-sensitive adhesive (PSA), a heat-responsive adhesive, a general adhesive, or a double-sided tape. According to an embodiment, the display panel 431 and the polarizer 432 may be integrally configured.

According to various embodiments, the second display 400 may include a control circuit (not illustrated). According to an embodiment, the control circuit may include: a flexible printed circuit board (FPCB) interconnecting a printed circuit board (e.g., the second printed circuit board 272 in FIG. 3) and the display panel 431 of the electronic device (e.g., the electronic device 200 in FIG. 3); and a display driver integrated circuit (DDIC) disposed on the FPCB. According to an embodiment, the second display 400 may additionally include a touch panel 433. According to an embodiment, when the second display 400 operates as an in-cell-type or on-cell-type touch display depending on the arrangement position of the touch panel 433, the control circuit may include a touch display driver integrated circuit (TDDIC). In another embodiment, the second display 400 may include a fingerprint sensor (not illustrated) disposed around the control circuit. According to an embodiment the fingerprint sensor may include an ultrasonic or optical fingerprint sensor capable of recognizing a fingerprint of a finger brought into contact with or approaching the fingerprint sensor from the outer surface of the second rear surface cover (e.g., the second rear surface cover 250 in FIG. 2A) through a hole at least partially provided in some of the components of the second display 400.

According to various embodiments, the one or more subsidiary material layers 440 may include: one or more polymer members 441 and 442 disposed on the rear surface of the display panel 431; at least one functional member 443 disposed on the rear surface of the one or more polymer members 441 and 442; and/or a conductive sheet 444 disposed on the rear surface of the at least one functional member 443. According to an embodiment, the one or more polymer members 441 and 442 may include: a light shielding layer 441 (e.g., a black layer including an uneven pattern) configured to remove air bubbles that may be generated between the display panel 431 and its lower attachments and block light generated by the display panel 431 or light incident from the outside; and/or a buffer layer 442 disposed for shock absorption. According to an embodiment, the at least one functional member 443 may include at least one of a heat dissipation sheet (e.g., a graphite sheet) for heat dissipation, a force touch FPCB, a fingerprint sensor FPCB, an antenna radiator for communication, a conductive/non-conductive tape, or an open cell sponge. According to an embodiment, the conductive sheet 444, which is a metal sheet layer (e.g., a metal plate), may be helpful for reinforcing the rigidity of an electronic device (e.g., the electronic device 101), and may be used to block ambient noise and disperse heat released from surrounding heat release components. According to an embodiment, the conductive sheet 444 may include Cu, aluminum (Al), magnesium (Mg), SUS, or CLAD (e.g., a stacked member in which SUS and Al are alternately disposed). As another embodiment, the display 400 may further include a detection member 445 configured to detect an input by an electromagnetic induction-type writing member (e.g., an electronic pen). According to an embodiment, the detection member 445 may include a digitizer. According to an embodiment, the detection member 445 may be disposed between the at least one polymer member 442 and the functional member 443. In another embodiment, the detection member 445 may be disposed between the display panel 431 and the at least one polymer member 443.

According to various embodiments, the subsidiary material layer 440 may include openings 4411, 4421, 4451, and 4441 provided at positions corresponding to a camera module (e.g., the third camera module 225 in FIG. 2A). According to an embodiment, the camera module (e.g., the third camera module 225 in FIG. 2A) may be disposed to be close to the rear surface of the display panel 431 through the openings 4411, 4421, 4451, and 4441. According to an embodiment, the polarizer 432 and/or the touch panel 433 disposed on the display panel 431 may include openings 4321 and 4331 perforated at corresponding positions to prevent performance degradation of the camera module (e.g., the third camera module 225 in FIG. 2A) due to a refractive index. In another embodiment, the polarizer 432 and/or the touch panel 433 may be subjected to transparency processing or removal of a polarization characteristic at a position corresponding to the camera module (e.g., the third camera module 125 in FIG. 1). As another embodiment, opening-free layers (e.g., the display panel 431 or the touch panel 433) may include a coating layer capable of index matching in order to minimize a difference in refractive index. According to various embodiments, the second display 400 may include an organic light-emitting diode (OLED) display or a liquid crystal display (LCD).

Figure 5:
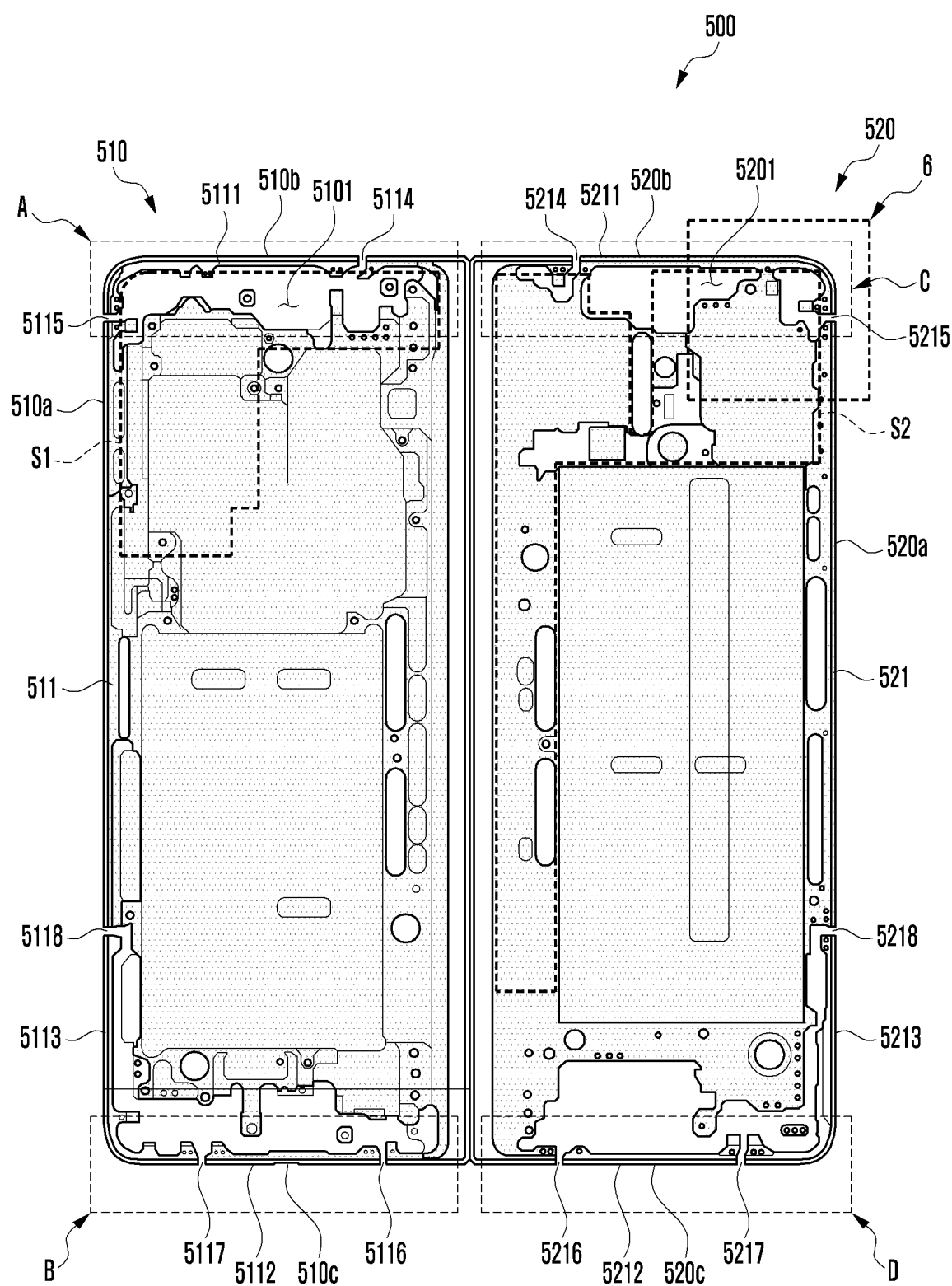
FIG. 5 is a view illustrating a configuration of an electronic device including an antenna according to an embodiment of the disclosure.

FIG. 5 is a view illustrating a configuration of an electronic device including an antenna according to an embodiment of the disclosure.

The electronic device 500 of FIG. 5 may be at least partially similar to the electronic device 101 of FIG. 1 or the electronic device 200 of FIG. 2A, or may further include another embodiment of the electronic device.

Referring to FIG. 5, the electronic device 500 may include: a foldable housing including a first housing 510

(e.g., the first housing 210 in FIG. 2A) and a second housing 520 (e.g., the second housing 220 in FIG. 2A) foldably connected to the first housing 510 via a hinge device (e.g., the hinge device 264 in FIG. 3); a first display (e.g., a flexible display) (e.g., the display 230 in FIG. 2A) supported from the first housing to at least a portion of the second housing 520 (e.g., the second housing 220 in FIG. 2A) via the hinge device (e.g., the hinge device 264 in FIG. 3); and/or a second display (e.g., the second display 400 in FIG. 2A) disposed on the second housing 520.

According to various embodiments, the first housing 510 may include a first lateral member 511 (e.g., the first lateral member 213 in FIG. 2A) configuring at least a portion of the exterior of the electronic device 500. According to an embodiment, the first lateral member 511 may include: a first side surface 510a disposed to have a length in a direction substantially parallel to the hinge device (e.g., the hinge device 264 in FIG. 3); a second side surface 510b extending from one end of the first side surface 510a in a direction substantially perpendicular to the same; and a third side surface 510c extending from the other end of the first side surface 510a in a direction perpendicular to the same. According to an embodiment, the first lateral member 511 may include one or more conductive portions 5111, 5112, and 5113 split by one or more non-conductive portions 5114, 5115, 5116, 5117, and 5118. According to an embodiment, the one or more conductive portions 5111, 5112, and 5113 may include: a first conductive portion 5111 disposed between a first non-conductive portion 5114 disposed in the second side surface 510b and a second non-conductive portion 5115 disposed in the first side surface 510a; a second conductive portion 5112 disposed between a third non-conductive portion 5116 and a fourth non-conductive portion 5117 disposed in the third side surface 510c; and/or a third conductive portion 5113 disposed between the fourth non-conductive portion 5117 and a fifth non-conductive portion 5118 in the first side surface 510a. According to an embodiment, the one or more conductive portions 5111, 5112, and 5123 may be used as an antenna operating in a predetermined first frequency band by being electrically connected to a first wireless communication circuit (e.g., the wireless communication module 192 in FIG. 1) disposed on a first substrate S1 disposed in a first space 5101 (e.g., a first inner space) of the first housing 510. For example, the antenna may be disposed in an upper area (area A) and/or a lower area (area B) of the first housing 510. According to an embodiment, the first frequency band may include a low band, a mid-band, a high band, and/or a sub-6 band. In some embodiments, the first frequency band may further include a Wi-Fi band and/or a Bluetooth band. In some embodiments, the first wireless communication circuit (e.g., the wireless communication module 192 in FIG. 1) may be configured to transmit and/or receive a radio signal in a predetermined first frequency band via a separate antenna radiator (e.g., a laser direct structuring (LDS) pattern disposed on an antenna carrier or a conductive pattern disposed on a first substrate) disposed in a first space 5101 of the first housing 510.

According to various embodiments, the second housing 520 may include a second lateral member 521 (e.g., the second lateral member 223 in FIG. 2A) configuring at least a portion of the exterior of the electronic device 500. According to an embodiment, the second lateral member 521 may include: a fourth side surface 520a disposed to have a length in a direction substantially parallel to the hinge device (e.g., the hinge device 264 in FIG. 3); a fifth side surface 520b extending from one end of the fourth side surface 520a in a direction substantially perpendicular to the same; and/or a sixth side surface 520c extending from the other end of the fourth side surface 520a in a direction perpendicular to the same. According to an embodiment, the second lateral member 521 may include one or more conductive portions 5211, 5212, and 5213 split by one or more non-conductive portions 5214, 5215, 5216, 5217, and 5218. According to an embodiment, the one or more conductive portions 5211, 5212, and 5213 may include: a fourth conductive portion 5211 disposed between a fourth non-conductive portion 5214 disposed in the fifth side surface 520b and a fifth non-conductive portion 5215 disposed in the fourth side surface 520a; a fifth conductive portion 5212 disposed between a sixth non-conductive portion 5216 and a seventh non-conductive portion 5217 disposed in the sixth side surface 520c; and/or a sixth conductive portion 5213 disposed between the seventh non-conductive portion 5217 and an eighth non-conductive portion 5218 in the fourth side surface 520a. According to an embodiment, the one or more conductive portions 5211, 5212, and 5223 may be used as an antenna operating in a predetermined second frequency band by being electrically connected to a second wireless communication circuit (e.g., the wireless communication module 192 in FIG. 1) disposed on a second substrate S2 disposed in a second space 5201 (e.g., a second inner space) of the second housing 520. For example, the antenna may be disposed in an upper area (area C) and/or a lower area (area D) of the second housing 520. According to an embodiment, the second frequency band may include a Wi-Fi band and/or a Bluetooth band. In some embodiments, the second frequency band may further include a low band, a mid-band, a high band, and/or a sub-6 band. In some embodiments, the second wireless communication circuit (e.g., the wireless communication module 192 in FIG. 1) may be configured to transmit and/or receive a radio signal in a predetermined second frequency band via a separate antenna radiator (e.g., a laser direct structuring (LDS) pattern disposed on an antenna carrier or a conductive pattern disposed on a first substrate) disposed in a second space 5201 of the second housing 520.

According to various embodiments, the second wireless communication circuit may be omitted. For example, the one or more conductive portions 5211, 5212, and 5223 may be used as an antenna operating in a predetermined second frequency band by being electrically connected to a first wireless communication circuit (e.g., the wireless communication module 192 in FIG. 1) disposed on the first substrate S1 disposed in the first space 5101 (e.g., the first inner space) of the first housing 510.

According to various embodiments, a plurality of conductive portions 5111, 5112, 5113, 5211, 5212, and 5213 disposed in areas (area A, area B, area C, and/or area D) of the first housing and the second housing, 5212, 5213) may be designed to operate in different frequency bands or to operate in a carrier aggregation (CA), a multi-input multi-output (MIMO), or diversity environment.

According to various embodiments, the fourth conductive portion 5211 may be disposed to be at least partially located in the space 5201 between a first display (e.g., the first display 230 in FIG. 2A) and a second display (e.g., the second display 400 in FIG. 2A), and when the fourth conductive portion 5211 operates as an antenna, a null may be generated by the two adjacent displays 230 and 400, which may deteriorate the radiation performance of the antenna.

According to an embodiment of the disclosure, the electrical connection between a conductive plate (e.g., the conductive plate 444 in FIG. 4) of the second display (e.g., the second display 400 in FIG. 2A) and a ground of a surrounding conductive structure (e.g., the second substrate S2) or a shield can (e.g., the shield can 532 in FIG. 8A) used as a ground (e.g., a common ground) within a predetermined distance from a feeding position of the fourth conductive portion 5211 may be helpful to overcome the performance degradation of the antenna, form additional resonance, or mitigate the null area of the antenna.

Figure 6A:
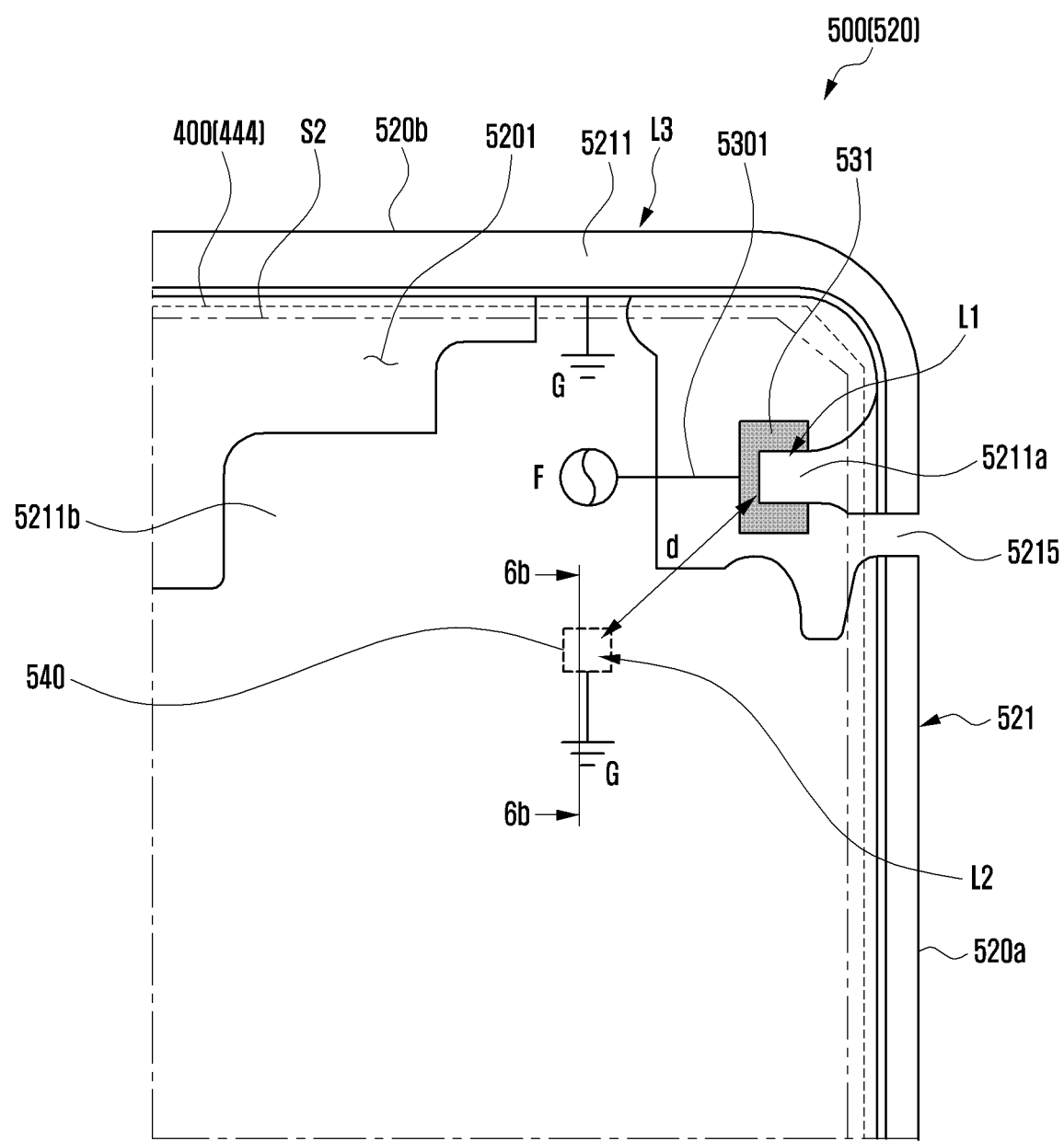
FIG. 6A is a view illustrating an antenna arrangement structure in the area 6 of FIG. 5 according to an embodiment of the disclosure.

FIG. 6A is a view illustrating an antenna arrangement structure in the area 6 of FIG. 5 according to an embodiment of the disclosure.

Figure 6B:
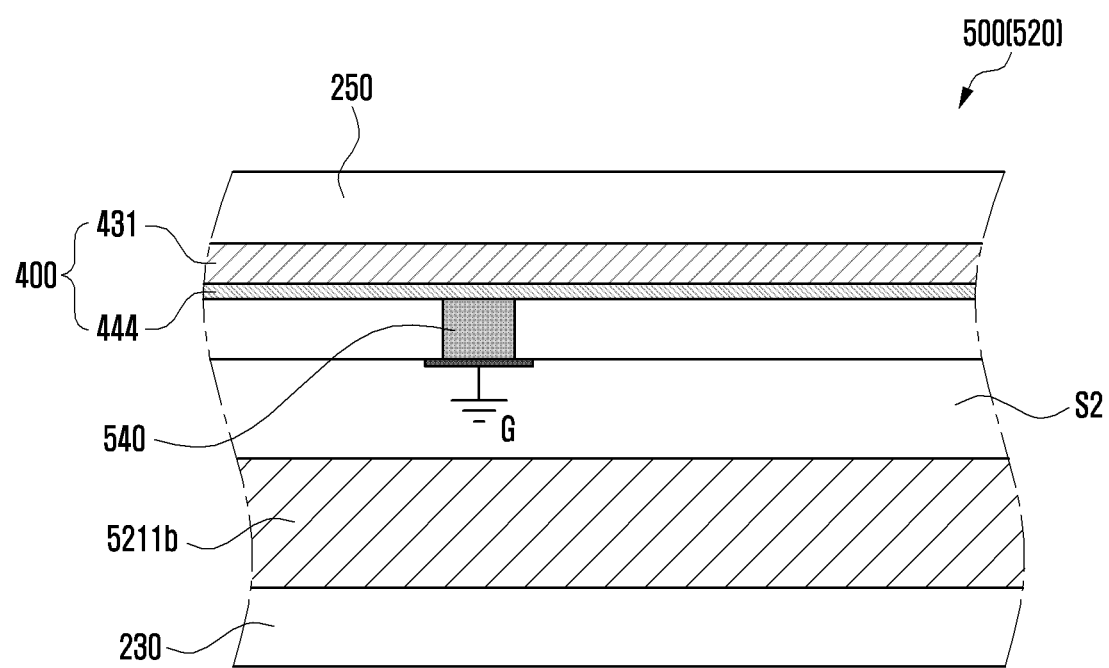
FIG. 6B is a partial cross-sectional view of the electronic device taken along line 6b-6b of FIG. 6A according to an embodiment of the disclosure.

FIG. 6B is a partial cross-sectional view of the electronic device taken along line 6b-6b of FIG. 6A according to an embodiment of the disclosure.

Referring to FIGS. 6A and 6B, the second housing 520 (hereinafter, referred to as a "housing") may include a second lateral member 521 (hereinafter, referred to as a "lateral member"). According to an embodiment, the lateral member 521 may include a fourth conductive portion 5211 (hereinafter, referred to as a "conductive portion") disposed to be split by one or more non-conductive portions (e.g., the sixth non-conductive portion 5214 and the seventh non-conductive portion 5215 in FIG. 5). According to an embodiment, the lateral member 521 may include a connection piece 5211a protruding from a first point L1 of the conductive portion 5211 spaced apart from the at least one non-conductive portion 5215 into a second space 5201 (hereinafter, an "inner space"). According to an embodiment, the lateral member 521 may include a conductive support member 5211b extending from the lateral member 521 to the inner space 5201. According to an embodiment, the conductive support member 5211b may be integrally configured with the conductive portion 5211. In some embodiments, the conductive support member 5211b may be disposed separately and structurally coupled with the conductive portion 5211. According to an embodiment, the second substrate S2 (hereinafter, referred to as a "substrate") disposed in the inner space 5201 of the housing 520 may be disposed to be supported by at least a portion of the conductive support member 5211b. According to an embodiment, the conductive portion 5211 may be connected to the conductive support member 5211b configured to operate as a ground at the third point L3.

According to various embodiments, the substrate S2 may include a connection portion 531 (e.g., a conductive pad) electrically connected to the connection piece 5211a. According to an embodiment, the connection piece 5211a may be physically and electrically connected to the connection portion 531 only through structural coupling in which the substrate S2 is disposed in the inner space 5201 of the housing 520. In some embodiments, the connecting piece 5211a may be electrically connected to the connecting portion 531 via a conductive connection member such as a C-clip or conductive tape. According to an embodiment, the connection portion 531 may be electrically connected to a wireless communication circuit F (e.g., the wireless communication module 192 in FIG. 1) via at least a portion of a first electrical path 5301 (e.g., a wiring line) provided on the substrate S2. According to an embodiment, the substrate S2 may further include a matching circuit (not illustrated) (e.g., a capacitor and/or an inductor) disposed in the first electrical path 5301. According to an embodiment, the wireless communication circuit F may be configured to transmit and/or receive a radio signal in a predetermined frequency band via the conductive portion 5211 of the lateral member 521. According to an embodiment, the predetermined frequency band may include a Wi-Fi band and/or a Bluetooth band (e.g., a band ranging from about 2.4 GHz to 5 GHz). In some embodiments, the predetermined frequency band may further include a low band, a mid-band, a high band, and/or a sub-6 band.

According to various embodiments, in the electronic device 500, at the second point L2 spaced apart from the first point L1, the conductive plate 444 of the second display 400 and the ground G of the substrate S2 may be electrically connected via the conductive connection member 540. For example, the conductive connection member 540 may induce electrical connection by being brought into physical contact with the conductive plate 444 and the ground G of the substrate S2. According to an embodiment, the conductive connection member 540 may be disposed at a position at which the conductive plate 440 of the second display 400 and the ground G of the substrate S2 overlap each other when the second display 400 is viewed from above. As another example, the conductive connection member 540 may be electrically connected to the conductive plate 444 and the ground included in the electronic device 500, and may electrically connect an electrical structure (not illustrated) located at a predetermined separation distance d. According to an embodiment, the predetermined separation distance d between the first point L1 (e.g., a feeding point) and the second point L2 at which the conductive connection member 540 is disposed may be determined within an electrical length of λ/2 of the antenna operating by using a conductive portion. According to an embodiment, the conductive connection member 540 may include at least one of a conductive clip (C-clip), a conductive tape, or a conductive gasket that physically interconnects the conductive plate 444 of the second display 400 and the ground G of the substrate S2.

Figure 7A:
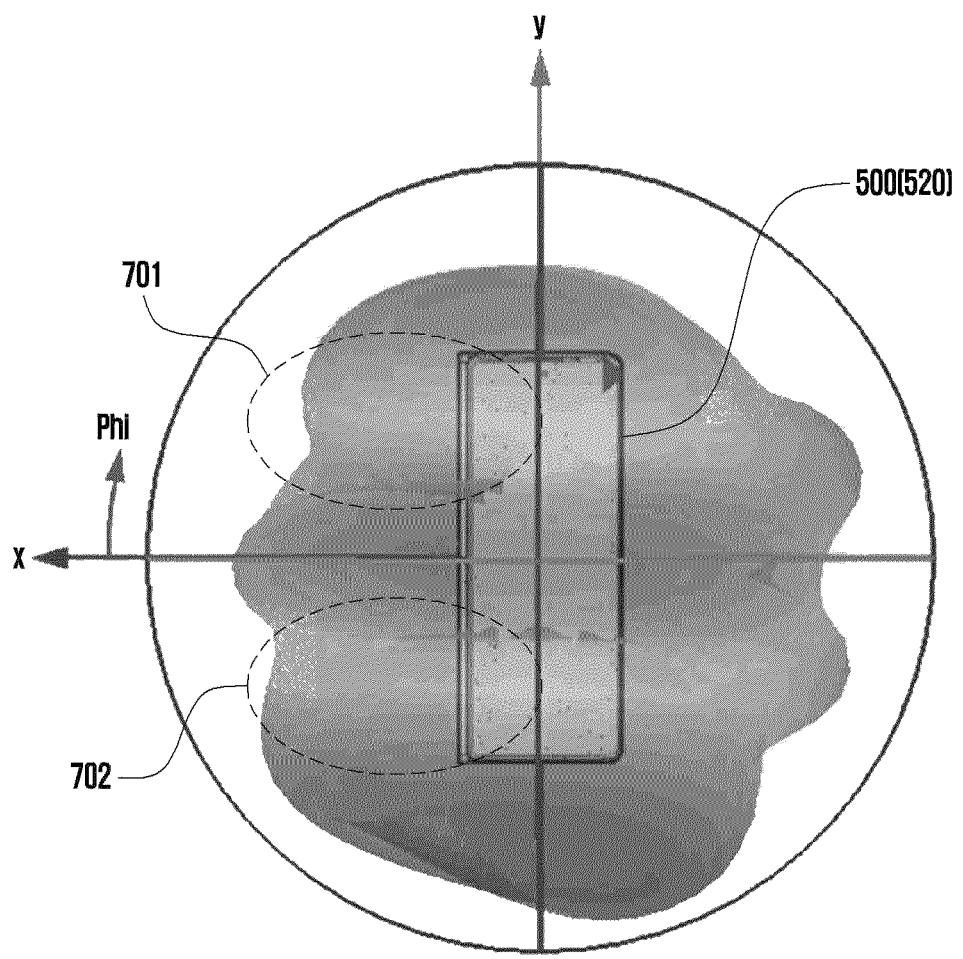
FIGS. 7A and 7B are diagrams illustrating, in comparison, radiation patterns of antennas depending on whether electrical connection between a conductive plate of a display and a conductive structure is present or not according to various embodiments of the disclosure.
Figure 7B:
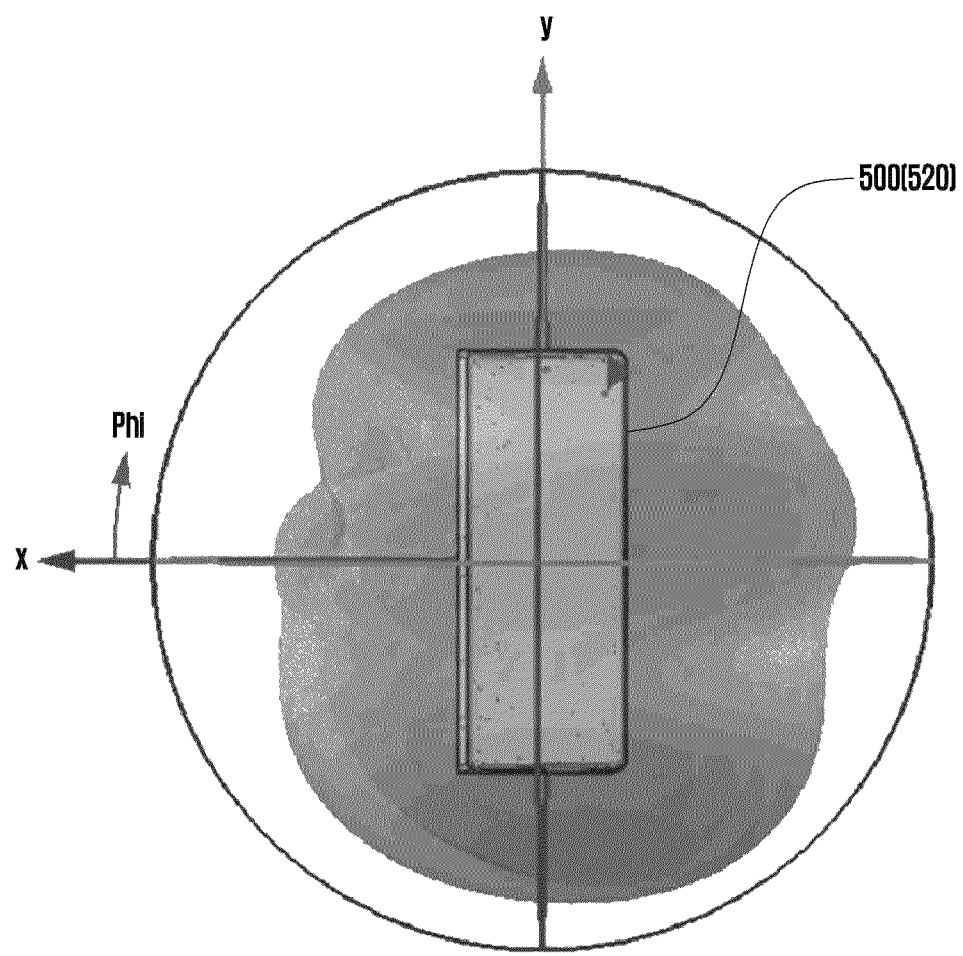

FIGS. 7A and 7B are diagrams illustrating, in comparison, radiation patterns of antennas depending on whether electrical connection between a conductive plate of a display and a conductive structure is present or not according to various embodiments of the disclosure.

As illustrated in FIG. 7A, when the conductive connection member 540 is not disposed between the conductive plate 444 of the second display 400 and the ground G of the substrate S2 (in the case of FIG. 7A), the null of the antenna provided by the conductive portion 5211 is significantly generated (areas 701 and 702). However, it can be seen that, when the conductive plate 444 of the second display 400 and the ground G of the substrate S2 are electrically connected to each other via the conductive connection member (in the case of FIG. 7B), the null is mitigated in the corresponding area and thus the radiation performance is improved.

Figure 8A:
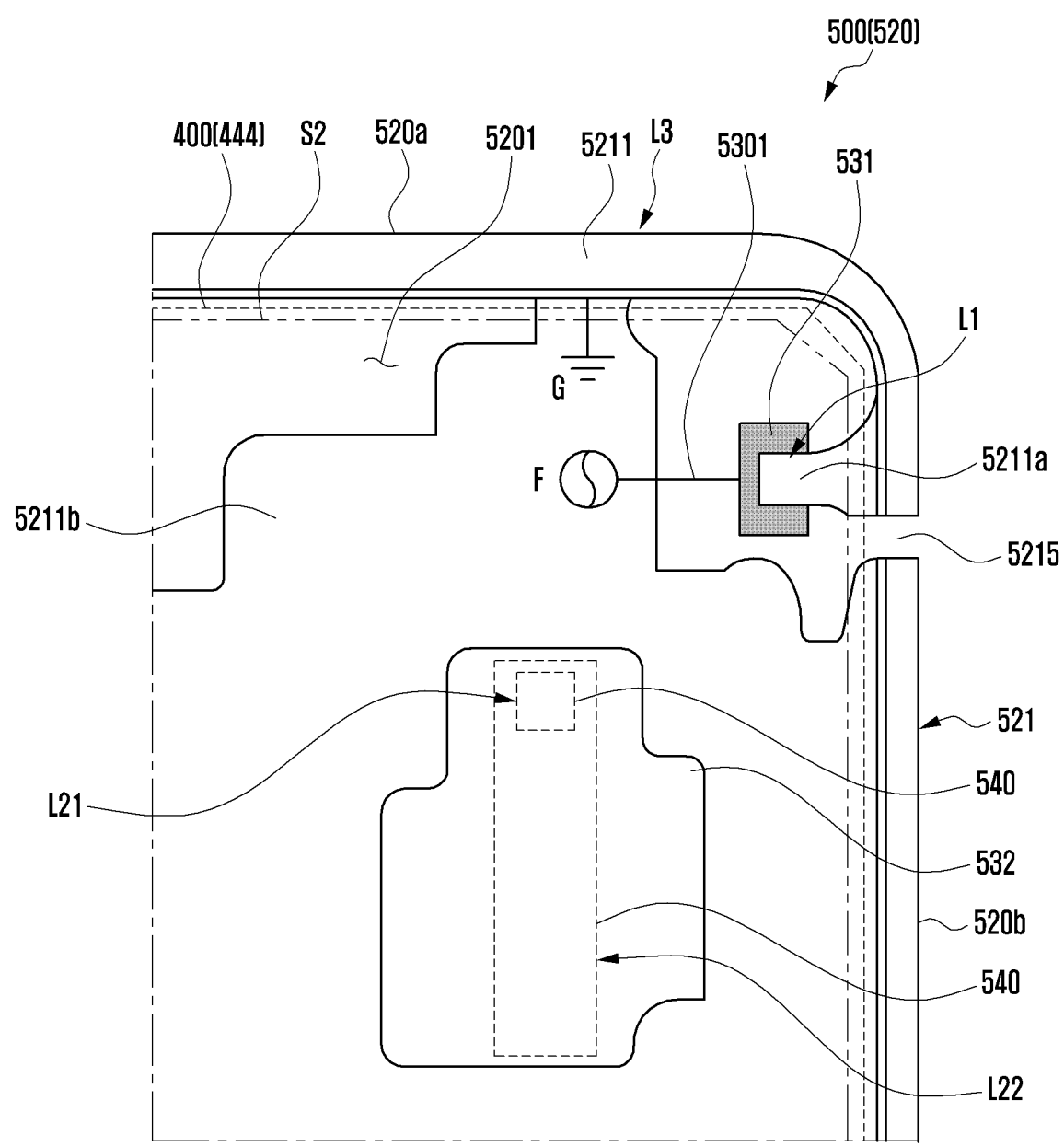
FIG. 8A is a view illustrating, in comparison, different contact areas between a conductive plate and a conductive structure of a display according to an embodiment of the disclosure.

FIG. 8A is a view illustrating, in comparison, different contact areas between a conductive plate and a conductive structure of a display according to an embodiment of the disclosure.

Figure 8B:
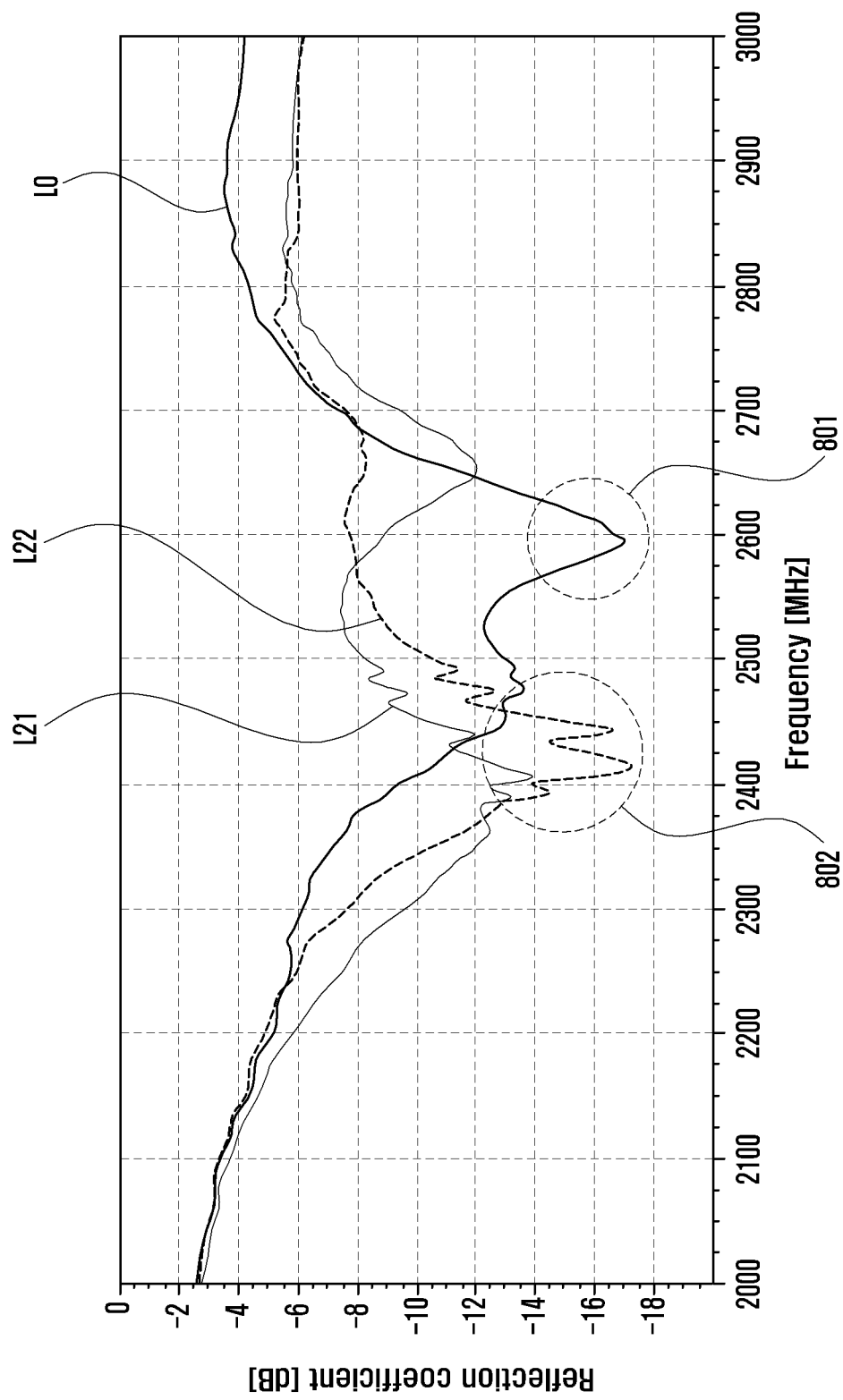
FIG. 8B is a graph showing radiation characteristics of the antenna to the contact areas according to an embodiment of the disclosure.

FIG. 8B is a graph showing radiation characteristics of the antenna to the contact areas according to an embodiment of the disclosure.

In describing the components of the electronic device 500 illustrated in FIG. 8A, the same reference numerals are assigned to components that are substantially the same as those of the electronic device 500 of FIG. 6A, and a detailed description thereof may be omitted.

Referring to FIG. 8A, the conductive plate 444 of the second display 400 is a conductive structure electrically connected to the ground G of the substrate S2 via the conductive connection member 540, and may be electrically connected to one surface of the shield can 532. For example, since the shield can 532 is electrically connected to the ground G of the substrate S2 used as the ground of the electronic device 500, the conductive plate 444 may be in the state of being substantially connected to the ground G2 of the substrate S2. In some embodiments, the conductive plate 444 may be electrically connected to at least one of a camera module, a speaker device, a receiver device, a sensor module, a socket device, or a connector module disposed in the electronic device 500 and electrically connected to the ground.

According to various embodiments, the conductive connection member 540 may be disposed to have a first contact area with the conductive plate 444 at a first separation point L21 spaced apart from the first point L1 by a predetermined distance. According to various embodiments, the conductive connection member 540 may be disposed to have a second contact area larger than the first contact area with the conductive plate 444 at a second separation point L22 spaced apart from the first point L1 by a predetermined distance. In this case, when the conductive connection member 540 has different contact areas from the first point L1 and the conductive plate 444 and the shield can 532 are electrically connected to each other via the conductive connection member 540, the radiation characteristic of the antenna may be variable.

Referring to FIG. 8B, L0 is a graph showing a case where the conductive plate 444 is not connected to the shield can 532, in which the antenna operates in an unwanted frequency band (the area 801), whereas, when the conductive plate 444 is connected to the shield can 532 at the first separation point L21 and the second separation point L22 via the conductive connection member 540, it can be seen that the antenna operates in a predetermined operating frequency band (e.g., about 2.4 GHz band) (the area 802). In addition, it can be seen that, when the conductive plate 444 is electrically connected to the shield can 532 via the second separation point L22 at which the contact area of the conductive connection member 540 is relatively large, the radiation performance is superior to that in the case where the conductive plate 444 is electrically connected via the first separation point L21.

Figure 9A:
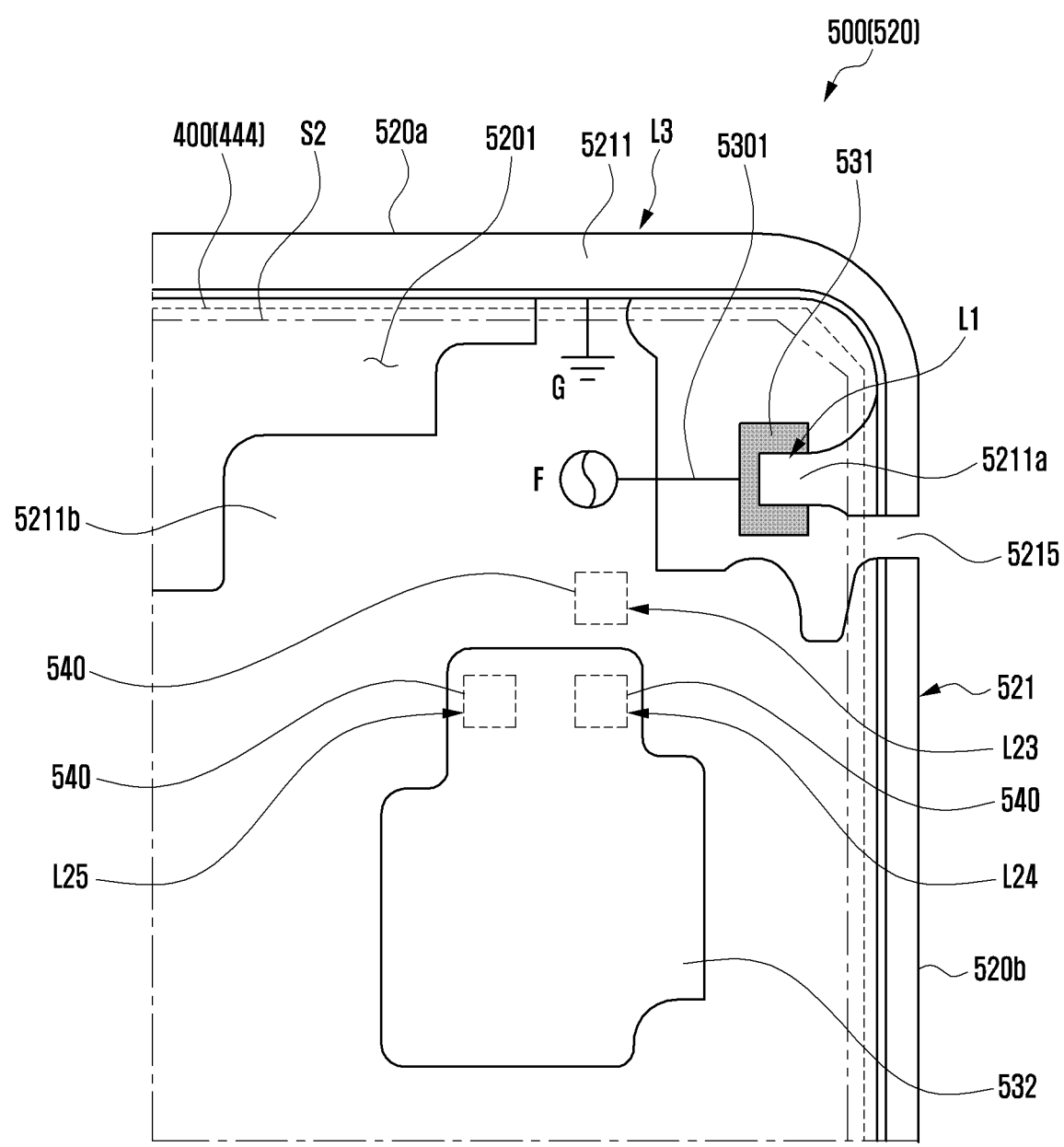
FIG. 9A is a view illustrating, in comparison, different contact positions between a conductive plate and a conductive structure of a display according to an embodiment of the disclosure.

FIG. 9A is a view illustrating, in comparison, different contact positions between a conductive plate and a conductive structure of a display according to an embodiment of the disclosure.

Figure 9B:
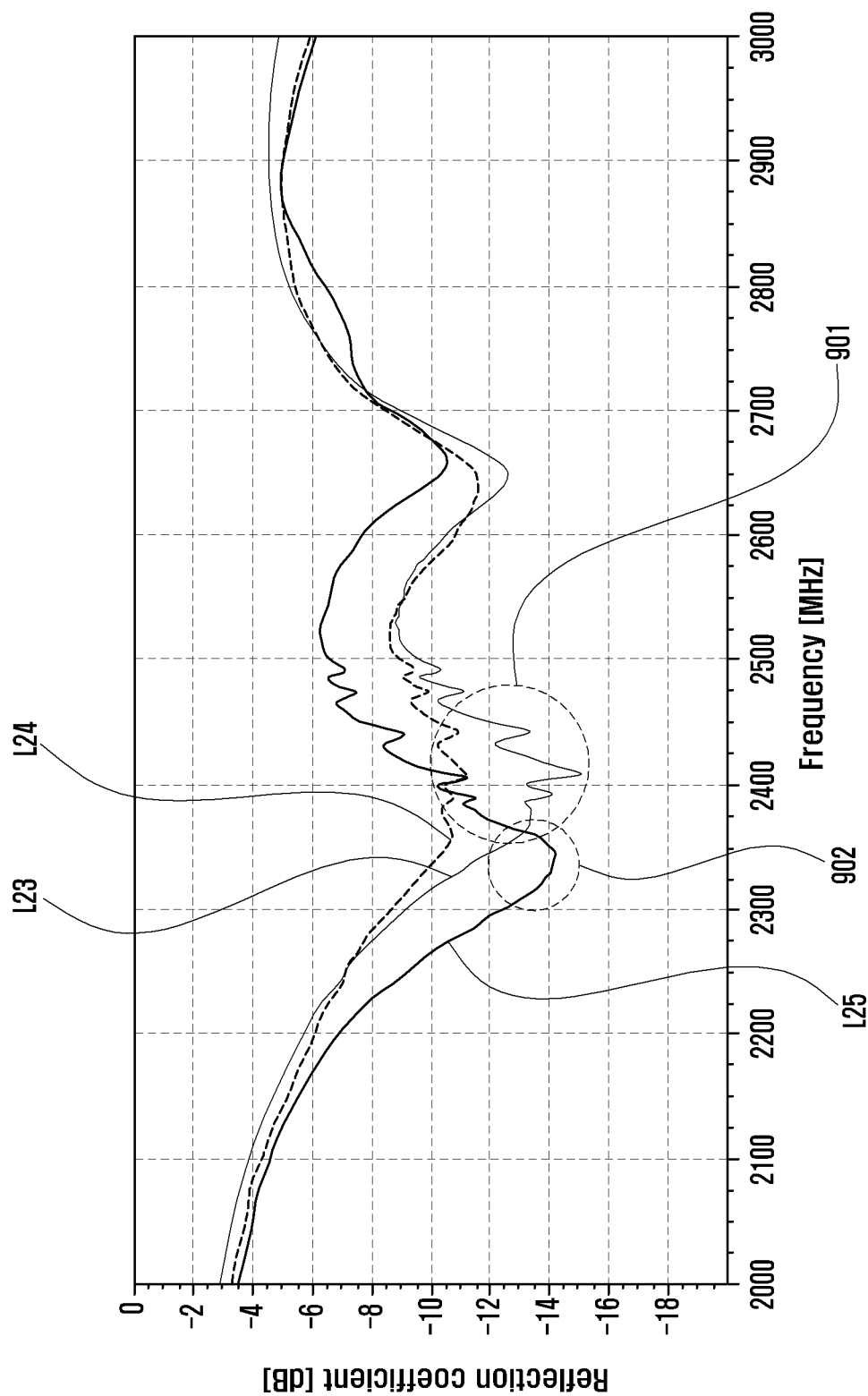
FIG. 9B is a graph showing radiation characteristics of the antenna to the positions according to an embodiment of the disclosure.

FIG. 9B is a graph showing radiation characteristics of the antenna to the positions according to an embodiment of the disclosure.

In describing the components of the electronic device 500 illustrated in FIG. 9A, the same reference numerals are assigned to components that are substantially the same as those of the electronic device 500 of FIG. 8A, and a detailed description thereof may be omitted.

Referring to FIG. 9A, the conductive plate 444 of the second display 400 may be connected to the shield can 532 electrically connected to a ground or the ground G of the substrate S2 via the conductive connection member 540. According to an embodiment, the conductive plate 444 may be electrically connected to the shield can 532 via the conductive connection member 540 at one of separation points having different separation distances from the first point L1. According to an embodiment, the conductive plate 444 may be electrically connected to the ground G of the substrate S1 via the conductive connection member 540 at a first separation point L23 spaced apart from the first point L1 by a predetermined distance. In some embodiments, the conductive plate 444 may be electrically connected to one surface of the shield can 532 disposed on the substrate S2 at the first separation point L23. According to an embodiment, the conductive plate 444 may be electrically connected to the shield can 532 via the conductive connection member 540 at a second separation point L24 that is farther than the first separation point L23 from the first point L1. According to an embodiment, the conductive plate 444 may be electrically connected to the shield can 532 via the conductive connection member 540 at a third separation point L25 that is farther than the second separation point L24 from the first point L1. In this case, when the conductive plate 444 and the shield can 532 are electrically connected via the conductive connection member 540 at the separation points L23, L24, and L25 that are separated from the first point L1 by different separation distances, respectively, the radiation characteristic of the antenna may be variable.

Referring to FIG. 9B, it can be seen that, when the conductive plate 444 is connected to the ground G of the substrate S2 via the conductive connection member 540 at a first separation point L23 that is located at a first separation distance from the first point L1, the antenna operates in a predetermined operating frequency band (the area 901) (e.g., the about 2.4 GHz band). In addition, it can be seen that, when the conductive plate 444 is electrically connected to the shield can 532 via the conductive connection member 540 at a second separation point L24 located at a second separation distance that is farther than the first separation distance from the first point L1, it can be seen that the performance of the antenna is slightly lower than that obtained at the first separation point L23 but the antenna also operates smoothly in the operating frequency band (the area 901). According to an embodiment, it can be seen that, when the conductive plate 444 is electrically connected to the shield can 532 via the conductive connection member 540 at a third separation point L25 located at a third separation distance that is farther than the second separation distance from the first point L1, the antenna is shifted from the operating frequency band to a low frequency band (the area 902). Therefore, it may mean that, depending on the electrical connection point between the conductive plate 444 and an electrical structure (e.g., the shield can and/or the substrate), which is separated away from the first point L1, the radiation performance may be improved or the operating frequency band may be shifted.

Figure 10A:
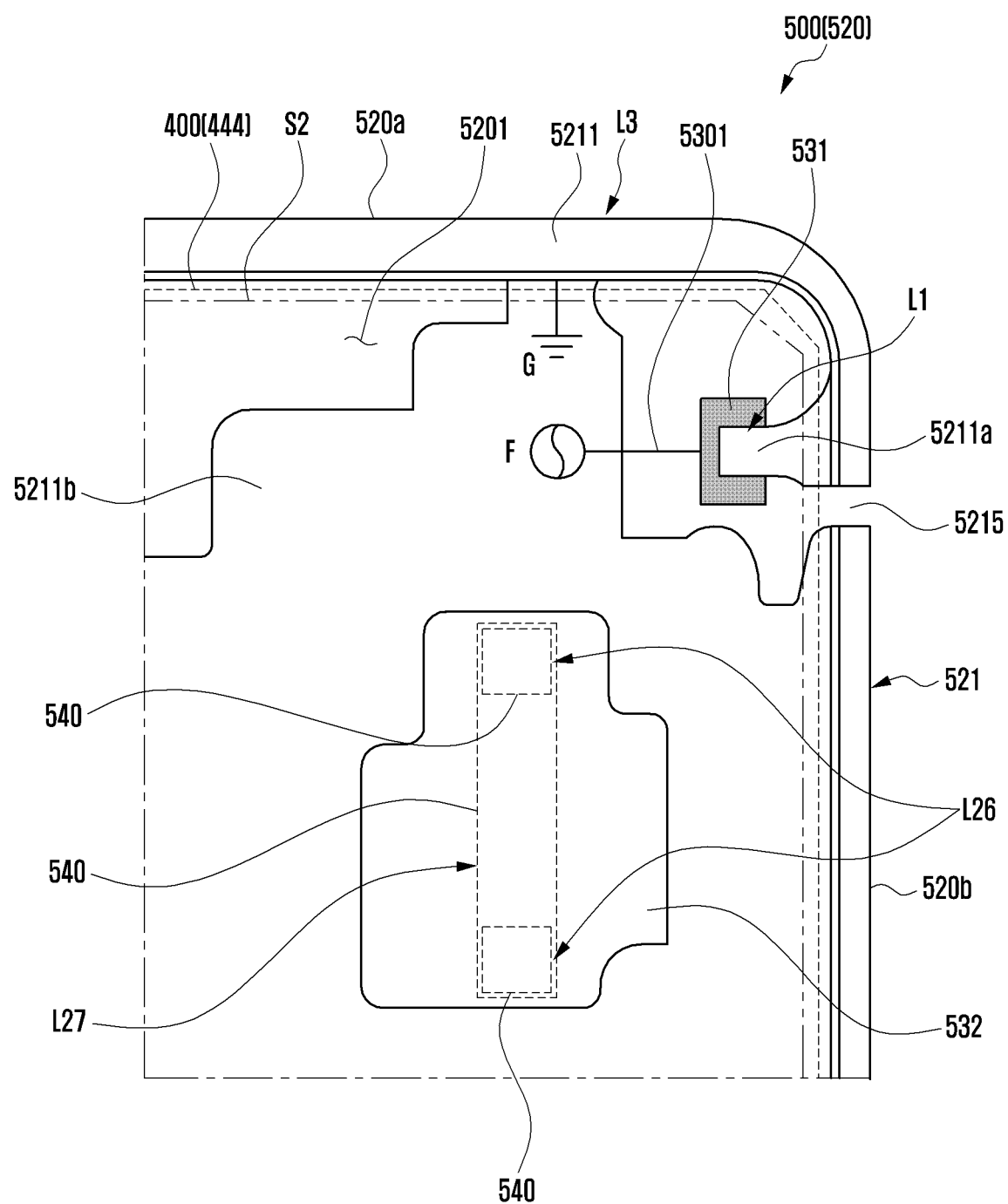
FIG. 10A is a view illustrating, in comparison, different numbers of contacts between a conductive plate and a conductive structure of a display according to an embodiment of the disclosure.

FIG. 10A is a view illustrating, in comparison, different numbers of contacts between a conductive plate and a conductive structure of a display according to an embodiment of the disclosure.

Figure 10B:
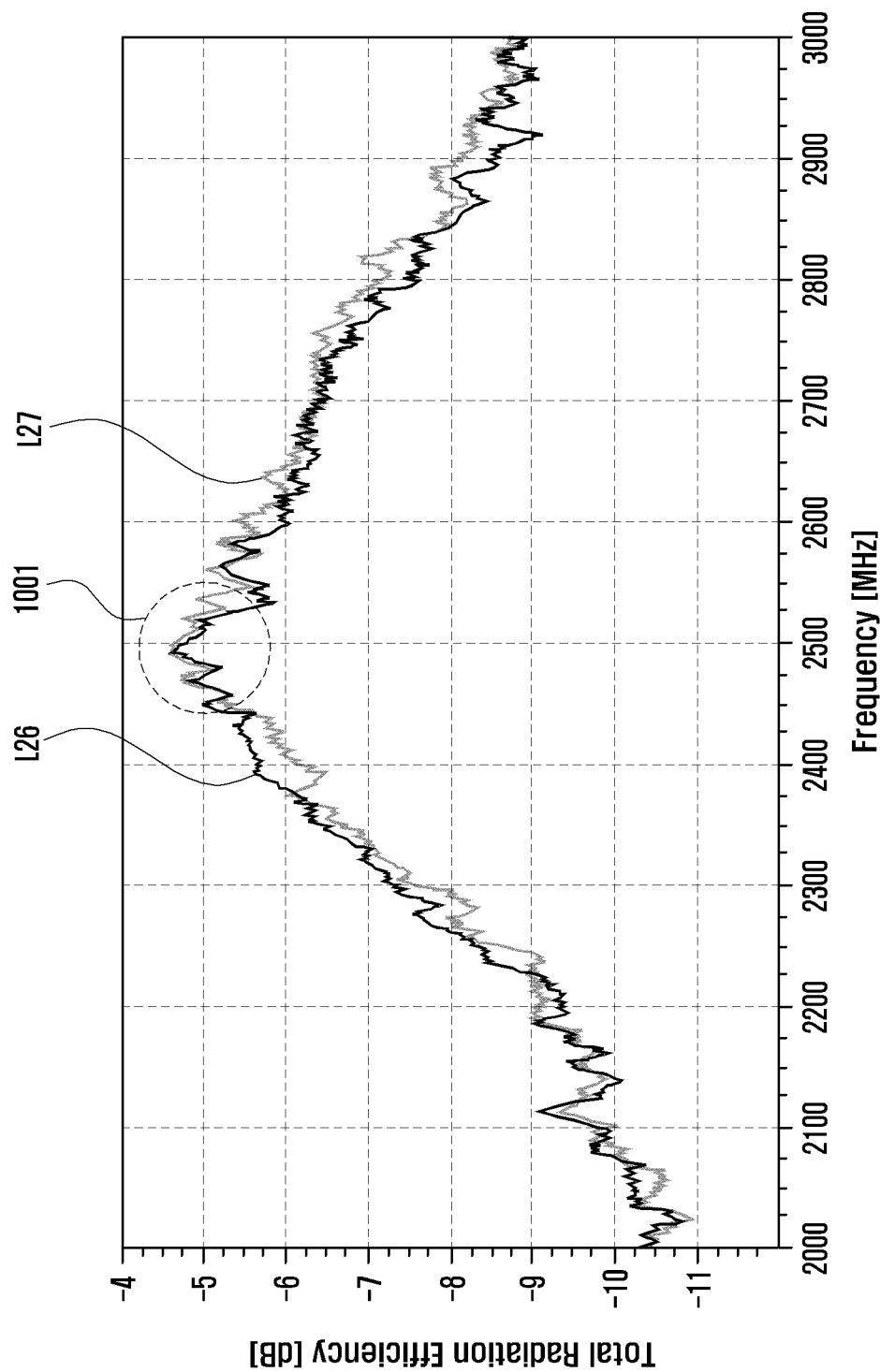
FIG. 10B is a graph showing radiation characteristics of the antenna to the positions according to an embodiment of the disclosure.

FIG. 10B is a graph showing radiation characteristics of the antenna to the numbers of contacts according to an embodiment of the disclosure.

Figure 10C:
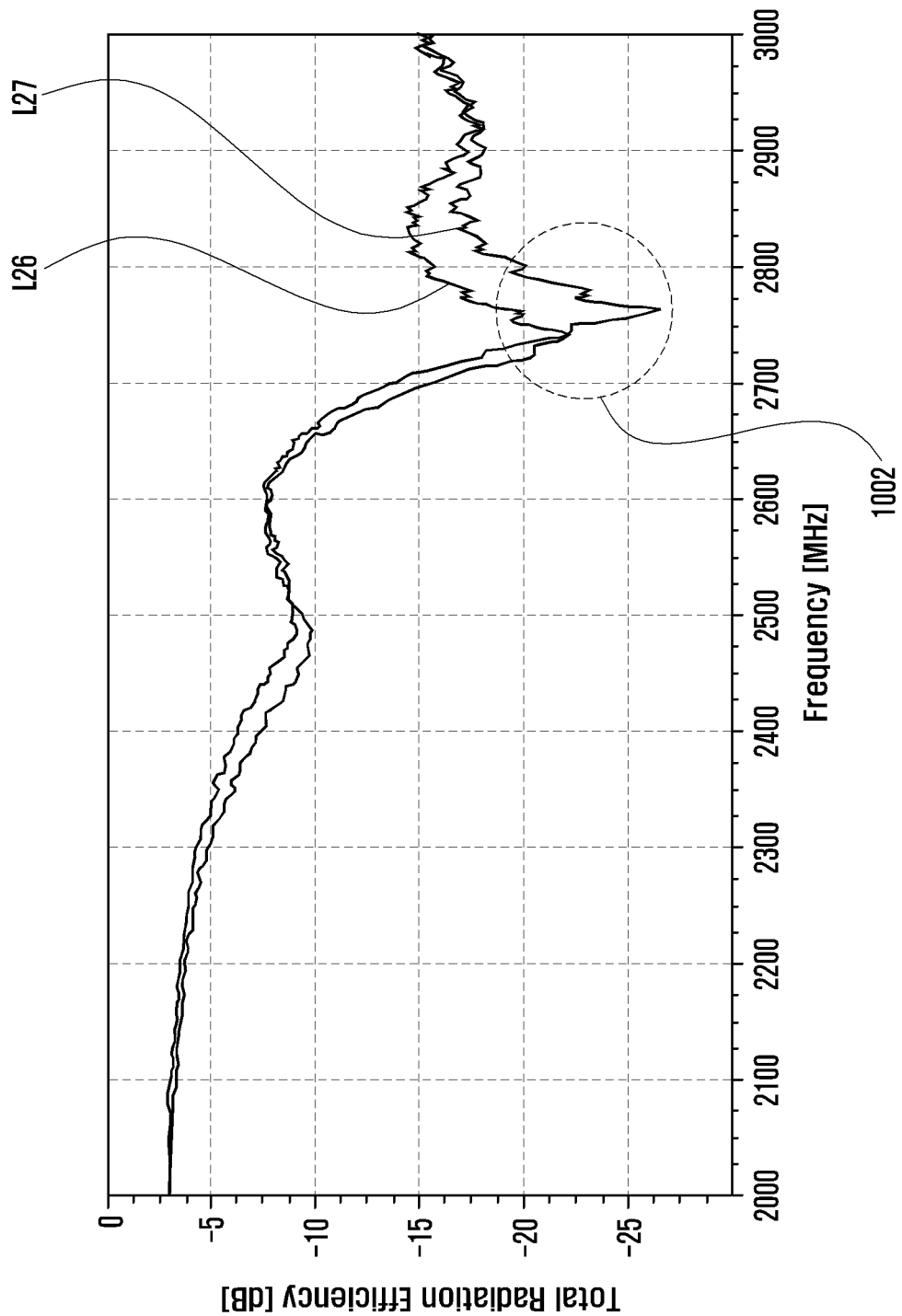
FIG. 10C is a graph a graph showing radiation characteristics of the antenna according to an embodiment of the disclosure.

FIG. 10C is a graph a graph showing radiation characteristics of the antenna according to an embodiment of the disclosure.

In describing the components of the electronic device 500 illustrated in FIG. 10A, the same reference numerals are assigned to components that are substantially the same as those of the electronic device 500 of FIG. 8A, and a detailed description thereof may be omitted.

Referring to FIG. 10A, the conductive plate 444 of the second display 400 may be connected to the shield can 532 electrically connected to a ground or the ground G of the substrate S2 via the conductive connection member 540. According to an embodiment, the conductive plate 444 may be simultaneously electrically connected to the shield can 532 via two conductive connection members 540 disposed at two separation points L26 that have different separation distances from the first point L1. For example, the sizes of the conductive connection members 540 disposed at two separation points L26 may be substantially the same as the sizes of the two separation points L26. According to an embodiment, the conductive plate 444 may be electrically connected to the shield can via a conductive connection member at a third separation point that is separated away from the first point L1 by a predetermined distance and has a contact area of a size including two separation points L26. For example, the size of the conductive connection member 540 disposed at the third separation point L27 may be substantially the same as that of the third separation point L27.

Referring to FIGS. 10B and 10C, in the case where the conductive plate 444 is electrically connected to the shield can 532 at two predetermined separation points L26 from the first point L1 via the conductive connection members 540, including the two separation points L26 and in the case where the conductive plate 444 is electrically connected to the shield can 532 at the third separation location L27 to have a contact point of a size including two separation points L26 (the area 1001 in FIG. 10B), the antenna exhibits similar radiation performance. However, compared to the case where the conductive plate 444 is electrically connected to the shield can 532 at two separation points L26, it can be seen that, when the conductive plate 444 is electrically connected to the shield can 532 via the conductive connection member 540 at the third separation point L27, the operating frequency band is shifted to a high frequency band (the region 1002 in FIG. 10C).

Figure 11A:
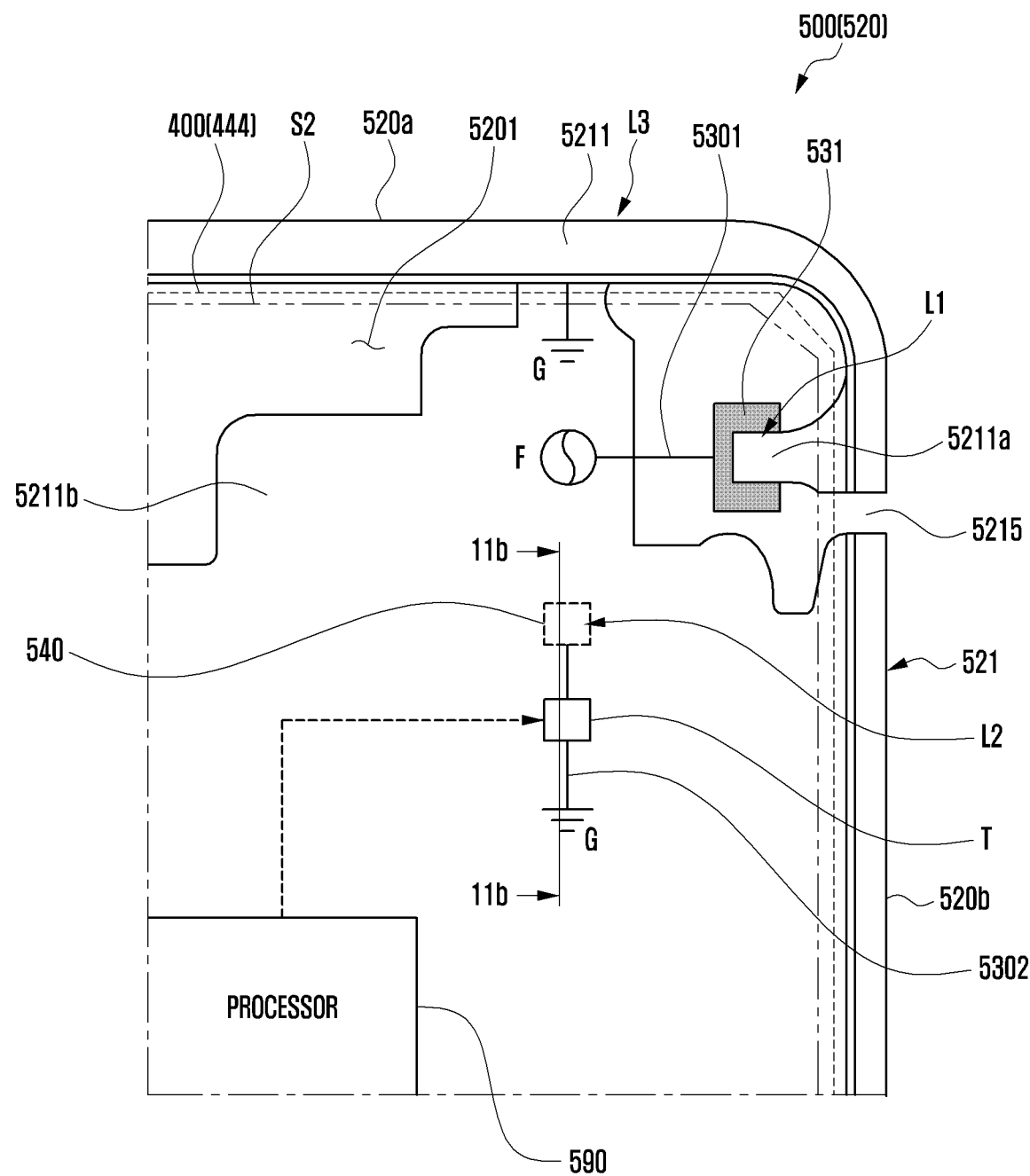
FIG. 11A is a view illustrating an antenna arrangement structure according to an embodiment of the disclosure.

FIG. 11A is a view illustrating an antenna arrangement structure according to an embodiment of the disclosure.

Figure 11B:
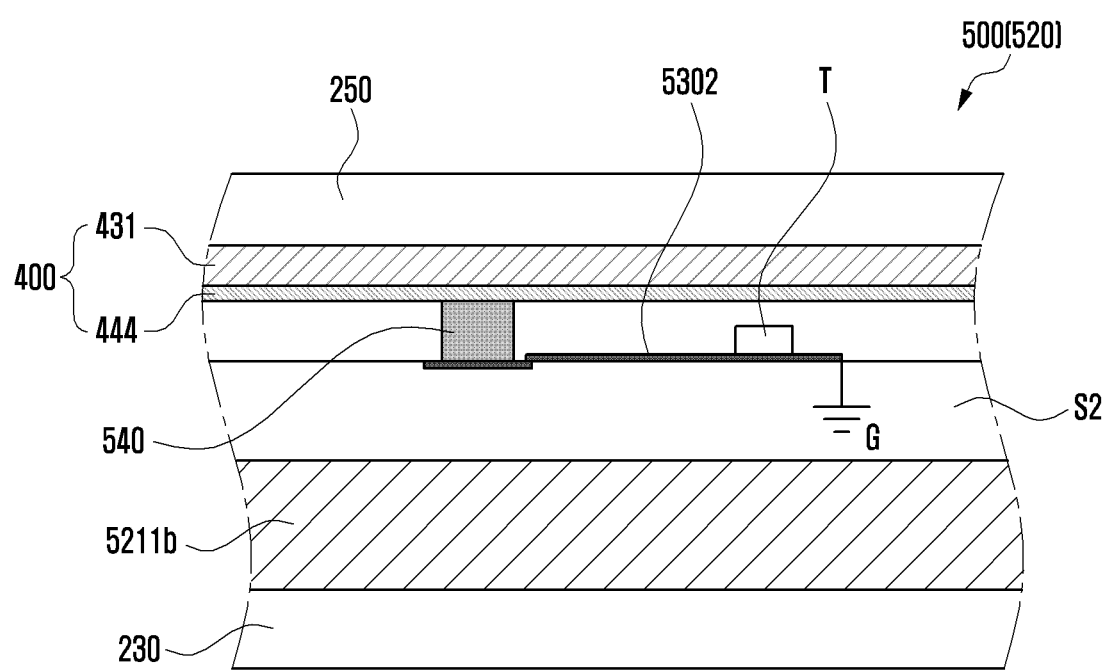
FIG. 11B is a partial cross-sectional view of the electronic device taken along line 11b-11b of FIG. 6A according to an embodiment of the disclosure.

FIG. 11B is a partial cross-sectional view of an electronic device taken along line 11b-11b of FIG. 11A according to an embodiment of the disclosure.

Figure 11C:
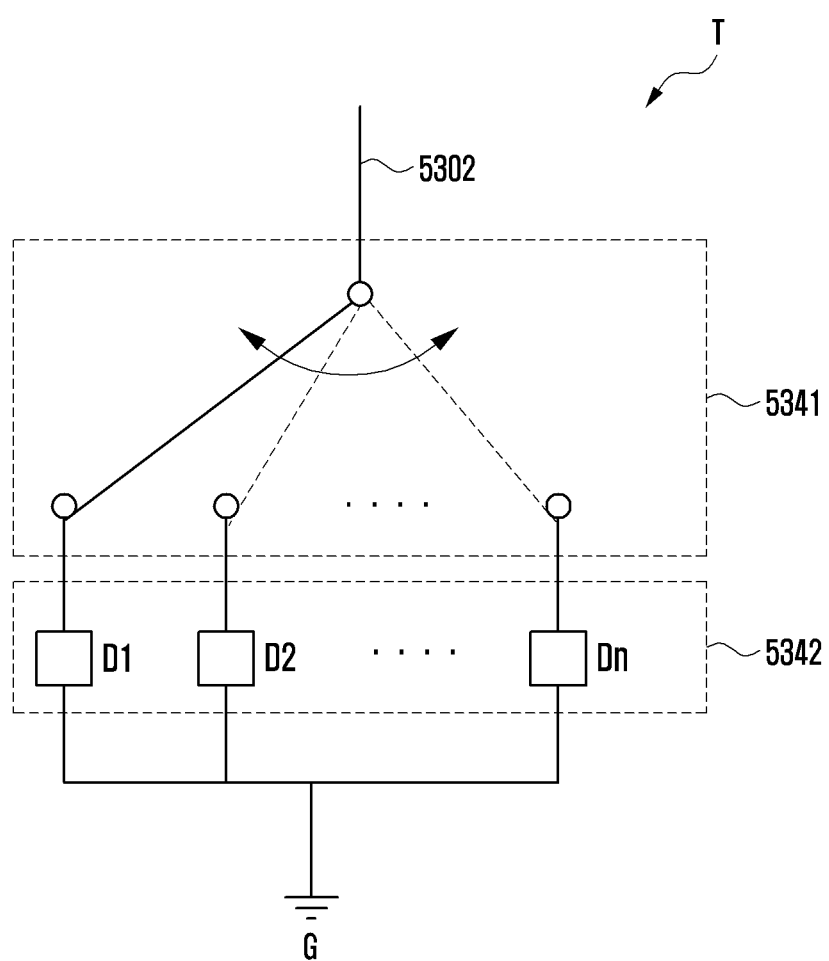
FIG. 11C is a view illustrating the configuration of the variable circuit of FIG. 11A according to an embodiment of the disclosure.

FIG. 11C is a view illustrating the configuration of the variable circuit of FIG. 11A according to an embodiment of the disclosure.

In describing the components of the electronic device 500 illustrated in FIG. 11A, the same reference numerals are assigned to components that are substantially the same as those of the electronic device 500 of FIG. 6A, and a detailed description thereof may be omitted.

Referring to FIGS. 11A to 11C, in a substrate S2, a variable circuit T may be disposed in a second electrical path 5302 interconnecting the second point L2 at which the conductive connection member 540 is contacted and the ground G of the substrate S2. According to an embodiment, the variable circuit T may be helpful for the improvement of radiation performance and/or the frequency shift of the antenna by being determined to have a predetermined time constant value through the control of the processor 590 (e.g., the processor 120 in FIG. 1) of the electronic device 500.

According to various embodiments, the variable circuit T may include at least one switch 5341 or a plurality of electrical elements 5342 (D1, D2, . . . , and Dn) that selectively interconnect the conductive connection member 540 and the ground G by at least one switch 5341 in the second electrical path 5302. According to an embodiment, the electrical elements 5342 are passive elements and may include a capacitor or an inductor. According to an embodiment, the at least one switch 5341 may include a microelectro mechanical system (MEMS) switch. According to an embodiment, since the MEMS switch, which performs a mechanical switching operation by an internal metal plate, has a complete turning-on/off characteristic, the MEMS may not substantially affect a change in radiation characteristic of the antenna. In some embodiments, the at least one switch 5341 may include a single pole single throw (SPST) switch, a single pole double throw (SPDT) switch, or a switch including three or more throws.

FIG. 11D is a graph illustrating, in comparison, frequency characteristics of an antenna obtained through a variable circuit according to an embodiment of the disclosure.

In an embodiment, a first electric element D1 may include a capacitor, and a second electric element D2 may include an inductor.

Referring to FIG. 11D, compared to the case where a conductive connection member 540 is not disposed between the conductive plate 444 of the second display 400 and the ground G of the substrate S2 (graph D0), in the case where the conductive plate 444 is connected to the ground G of the substrate S2 via the first electric element of the variable circuit T (graph D1) and the case where the conductive plate 444 is connected to the ground G2 of the substrate S2 via the second electrical element of the variable circuit T (graph D2), it can be seen that the antenna is gradually highly shifted in the operating frequency band 1101. This may mean that the frequency characteristic of the antenna is adjustable through element values of the variable circuit T disposed between the conductive connection member 540 and the ground G of the substrate S2.

Figure 12A:
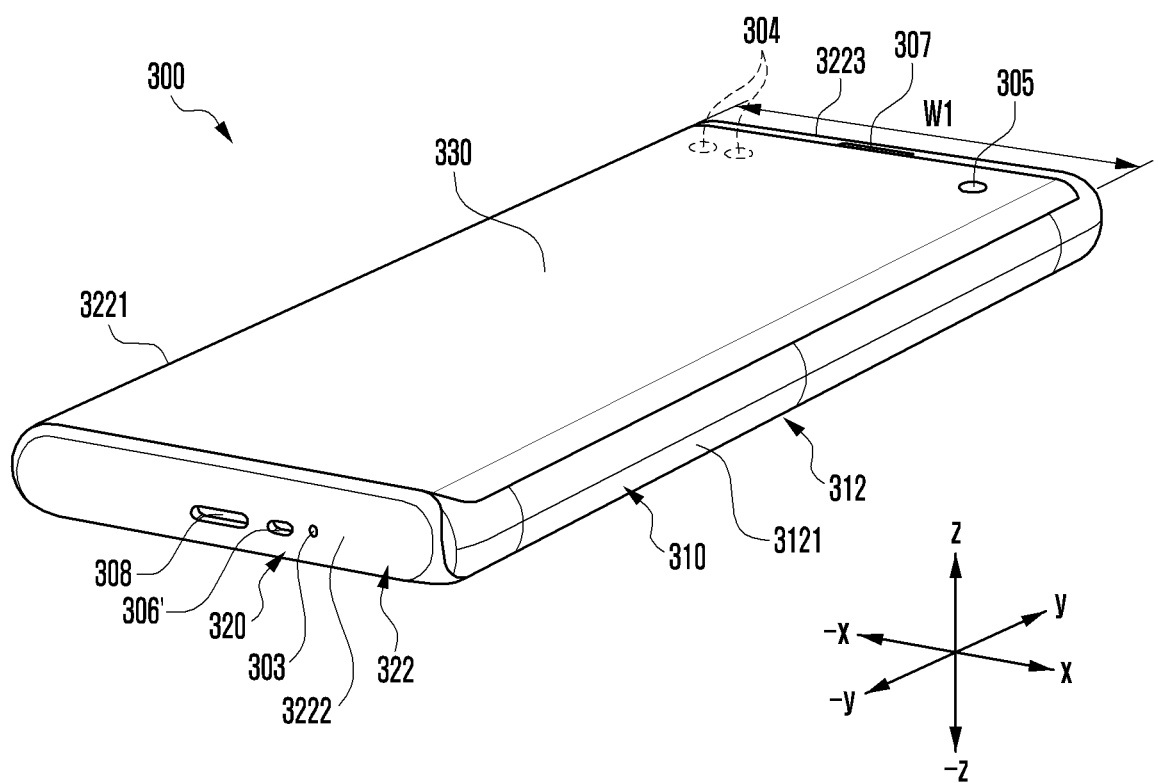
FIGS. 12A and 12B are front perspective views illustrating an electronic device in the closed state and the opened state, respectively according to various embodiments of the disclosure.
Figure 12B:
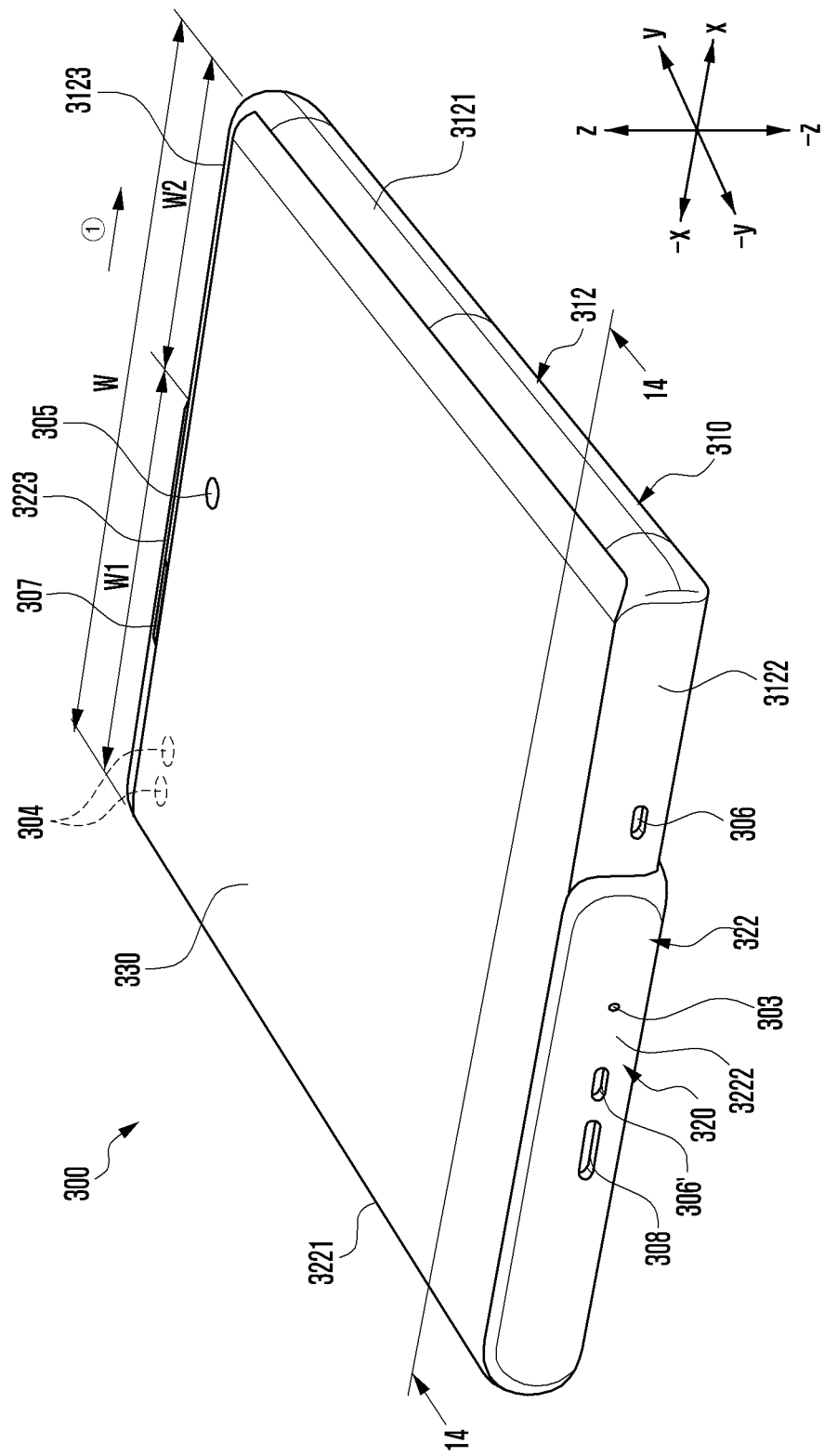

FIGS. 12A and 12B are front perspective views illustrating an electronic device 300 in the slide-in state and the slide-out state, respectively according to various embodiments of the disclosure.

Figure 13A:
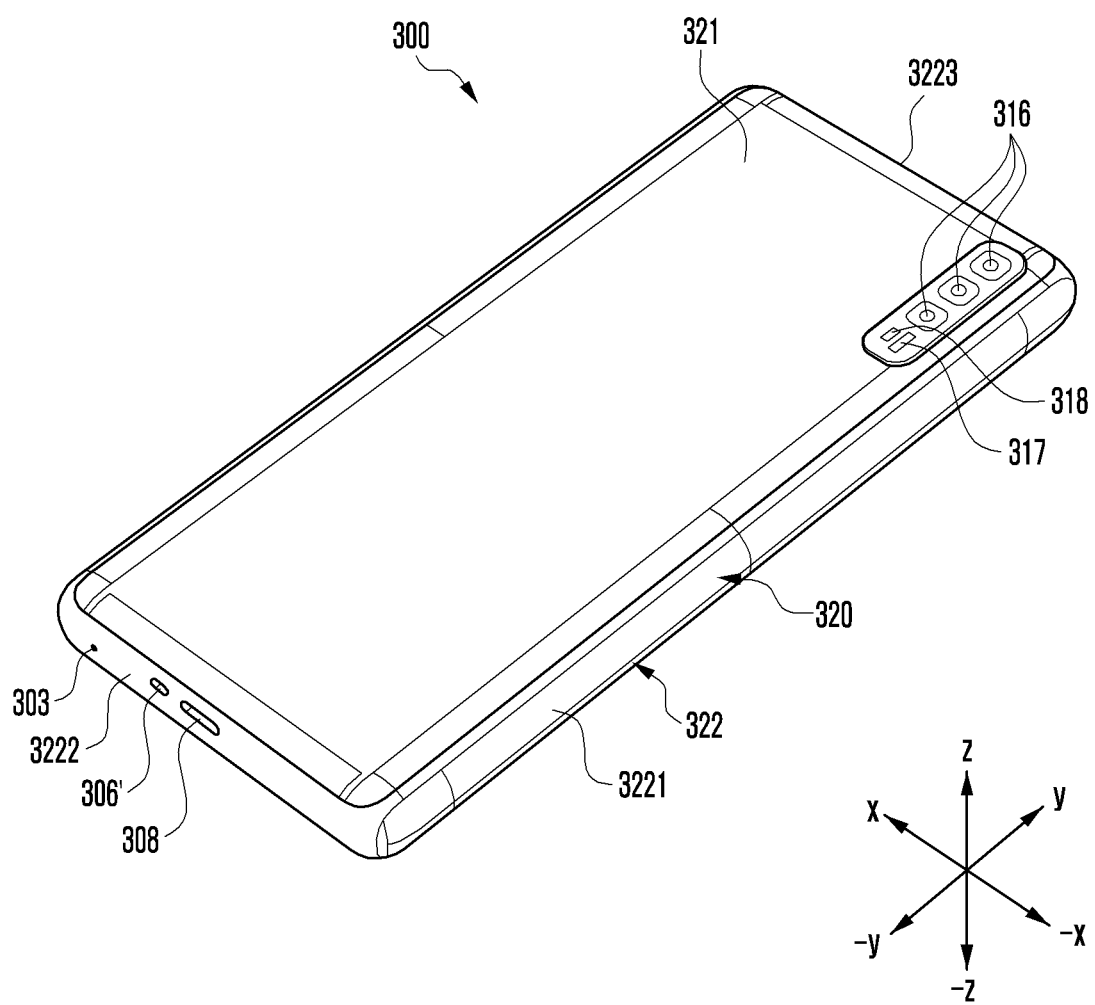
FIGS. 13A and 13B are front perspective views illustrating an electronic device in the closed state and the opened state, respectively according to various embodiments of the disclosure.
Figure 13B:
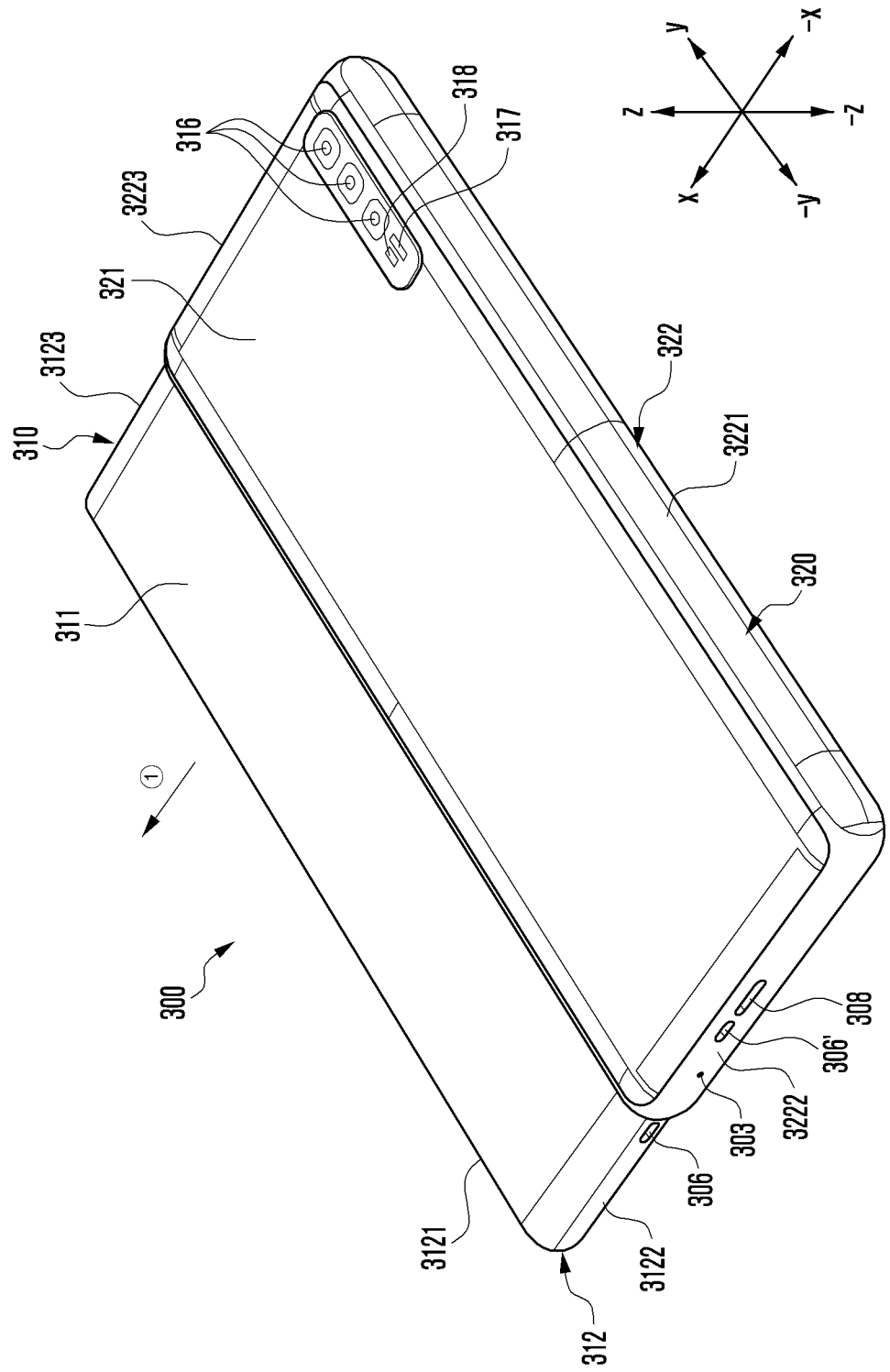

FIGS. 13A and 13B are rear perspective views of the electronic device 300 in the slide-in state and the slide-out state, respectively according to various embodiments of the disclosure.

The electronic device 300 of FIG. 12A is a rollable type and/or slide type electronic device, and is at least partially similar to the electronic device 101 of FIG. 1 or may further include other embodiments of an electronic device.

Referring to FIGS. 12A, 12B, 13A, and 13B, the electronic device 300 may include a first housing 310 and a second housing 320 that is coupled to the first housing 310 to be at least partially movable. According to an embodiment, the first housing 310 may include a first plate 311 (e.g., the first plate 311 of FIG. 13B) and a first side surface frame 312 extending along the periphery of the first plate 311. According to an embodiment, the first side surface frame 312 may include: a first side surface 3121; a second side surface 3122 extending from one end of the first side surface 3121; and a third side surface 3123 extending from the other end of the first side surface 3121. According to an embodiment, the first housing 310 may include a first space (e.g., the first space 3101 in FIG. 14) which is at least partially closed from the outside by the first plate 311 and the first side surface frame 312.

According to various embodiments, the second housing 320 may include a second side surface frame 322 extending substantially along the periphery of the second plate 321 (e.g., the second plate 321 in FIG. 13A). According to an embodiment, the second side surface frame 322 may include: a fourth side surface 3221 facing an opposite direction to the first side surface 3121; a fifth side surface 3222 extending from one end of the fourth side surface 3221 and at least partially coupled to the second side surface 3122; and a sixth side surface 3223 extending from the other end of the fourth side surface 3221 and at least partially coupled to the third side surface 3123. As another embodiment, the fourth side surface 3221 may extend from a structure other than the second plate 321 and may be coupled to the second plate 321. According to an embodiment, the second housing 320 may include a second space (e.g., the second space 3201 in FIG. 14) which is at least partially closed from the outside by the second plate 321 and the second side surface frame 322. According to an embodiment, the first plate 311 and the second plate 321 may be disposed to at least partially configure the rear surface of the electronic device 300. The first plate 311, the second plate 321, the first side surface frame 312, and/or the second side surface frame 322 may be formed of, for example, a polymer, coated or colored glass, ceramic, metal (e.g., aluminum, stainless steel (STS), or magnesium), or a combination of two or more of these materials.

According to various embodiments, the electronic device 300 may include a flexible display 330 disposed to be supported by the first housing 310 and the second housing 320. According to an embodiment, in the electronic device 300, the first housing 310 may be at least partially inserted into the second space (e.g., the second space 3201 in FIG. 14) of the second housing 320, and may be coupled to be movable in the illustrated direction ①. For example, in the slide-in state, the electronic device 300 may be maintained in the state in which the first housing 310 and the second housing are coupled to each other such that the first side surface 3121 and the fourth side surface 3221 has a first distance w1 therebetween, and flexible display 330 may have a display area of a first size. According to an embodiment, in the slide-out state, the electronic device 300, the electronic device 300 may be maintained in the slide-out state in which the first housing 310 is slid out from the second housing 320 by a predetermined distance w2 to have a second separation distance w, whereby the display area of the flexible display 330 is expandable to have a second size greater than the first size. According to an embodiment, the flexible display 330 may be supported by the first housing 310 and/or the second housing 320 so that both ends thereof have curved edges. As another example, the flexible display 330 may be supported by the first housing 310 and/or the second housing 320 so that at least one end thereof has a curved edge. As another example, the flexible display 330 is curved at both ends thereof in FIGS. 12A, 12B, 13A, and 13B, but the exposed portion thereof may not be curved.

Figure 14:
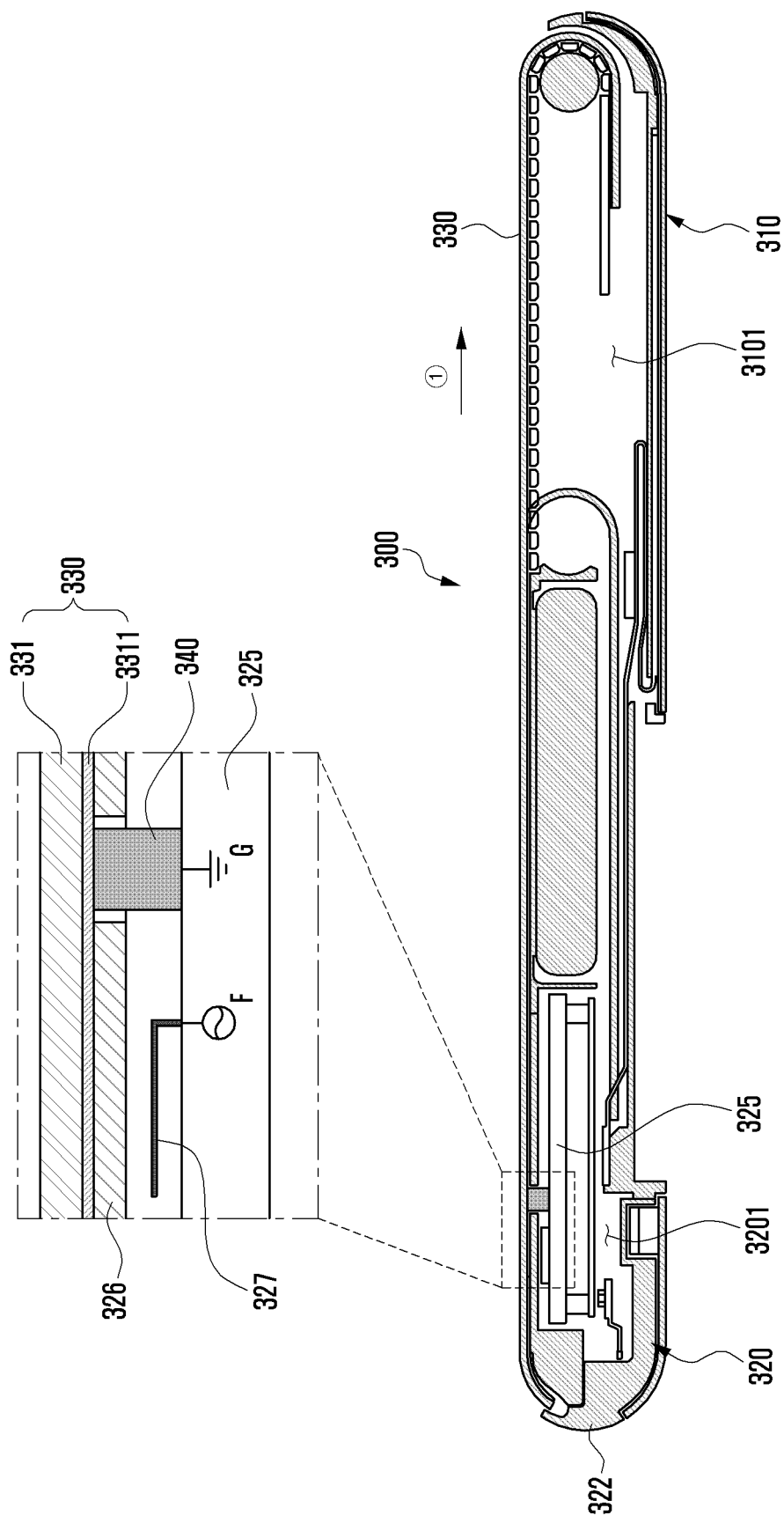
FIG. 14 is a cross-sectional view of the electronic device, taken along line 14-14 of FIG. 12B according to an embodiment of the disclosure.

According to various embodiments, the electronic device 300 may be changed to the slide-out state and the slide-in state by a slide module (not illustrated) disposed in the first space (e.g., the first space 3101 in FIG. 14) and/or the second space (e.g., the second space 3201 in FIG. 14). According to an embodiment, the first housing 310 may be automatically slid out through a separate driving unit. In some embodiments, the first housing 310 may be manually slid out from the second housing 320 through a user's manipulation. In some embodiments, the first housing 310 may be slid out by a desired slide-out amount by the user, and thus the display area of the flexible display 330 is also variable to various sizes. Accordingly, the processor (e.g., the processor 120 of FIG. 1) of the electronic device 300 may be configured to control the flexible display 330 to display objects and execute application programs in various ways corresponding to the changed display area of the first housing 310.

According to various embodiments, the electronic device 300 may include at least one of an input device 303, sound output devices 306 and 307, sensor modules 304 and 317, camera modules 305 and 316, a connector port 308, a key input device (not illustrated), or an indicator (not illustrated). As another embodiment, in the electronic device 300, at least one of the above-mentioned components may be omitted, or other components may be additionally included.

According to various embodiments, the input device 303 may include a microphone. In some embodiments, the input device 303 may include a plurality of microphones arranged to detect the direction of sound. According to an embodiment, the sound output devices 306 and 307 may include speakers. The sound output devices 306 and 307 may include an external speaker 306 and/or a phone call receiver 307. For example, when an external speaker 306 is disposed in the first housing 310, the external speaker 306 may be configured to output sound through a speaker hole 306' provided in the second housing 320 in the slide-in state. In some embodiments, the external speaker 306 may be disposed in the second housing 320. According to an embodiment, the input device 303 or the connector port 308 may have substantially the same configuration. In another embodiment, the sound output devices 306 and 307 may include a speaker (e.g., a piezo speaker) that operates without a separate speaker hole 306.

According to various embodiments, the sensor modules 304 and 317 may generate electrical signals or data values corresponding to the internal operating state of the electronic device 300 or an external environmental state. The sensor modules 304 and 317 may include, for example, a first sensor module 304 (e.g., a proximity sensor or an illuminance sensor) disposed on the front surface of the second housing 320 and/or a second sensor module 317 (e.g., a heart rate monitor (HRM) sensor) disposed on the rear surface of the second housing 320. According to an embodiment, the first sensor module 304 may be disposed under the flexible display 330 in the second housing 320. According to an embodiment, the first sensor module 304 may further include at least one of a proximity sensor, an illuminance sensor 204, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments, the camera modules 305 and 316 may include a first camera module 305 disposed on the front surface of the second housing 320 of the electronic device 300 and a second camera module 316 disposed on the rear surface of the second housing 320. According to an embodiment, the electronic device 300 may include a flash 318 disposed in the vicinity of the second camera module 316. According to an embodiment, the camera modules 305 and 316 may include one or more lenses, an image sensor, and/or an image signal processor. According to an embodiment, the first camera module 305 may be disposed under the flexible display 330, and may be configured to photograph a subject through a portion of an active area of the flexible display 330. According to an embodiment, the flash 318 may include, for example, a light-emitting diode or a xenon lamp. In some embodiments, two or more lenses (e.g., a wide-angle lens and a telephoto lens) and image sensors may be disposed on one surface of the electronic device 300.

FIG. 14 is a cross-sectional view of the electronic device, taken along line 14-14 of FIG. 12B according to an embodiment of the disclosure.

Referring to FIG. 14, the electronic device 300 may include: a first housing 310; a second housing 320 coupled to the first housing 310 to be slid out or slid in through a sliding motion from at least a portion of the first housing 310; and a flexible display 330 having a display area variable in response to the slide-in and slide-out operations of the second housing 320 while being supported by at least a portion of the first and second housings 310 and 320. According to an embodiment, the flexible display 330 may be disposed to be supported by a support member 326 disposed in the second housing 320. According to an embodiment, the flexible display 330 may include: a display panel 331; and a conductive plate 3311 (e.g., the conductive plate 444 in FIG. 4) disposed on the rear surface of the display panel 331 to reinforce rigidity and/or improve flexibility.

According to various embodiments, the electronic device 300 may include a substrate 325 and an antenna 327 disposed in the second space 3201 of the second housing 320. In some embodiments, the antenna 327 may be replaced with an antenna including at least a portion of the conductive second side surface frame of the second housing 320 that is electrically connected to a wireless communication circuit (e.g., the wireless communication module 192 of FIG. 1) of the substrate 325. In some embodiments, the conductive pattern included in the antenna 327 disposed in the second space 3201 of the second housing 320 and at least a portion of the conductive side surface frame 322 may be used together as an antenna radiator. According to an embodiment, the substrate 325 may include a wireless communication circuit F. According to an embodiment, the wireless communication circuit F may be electrically connected to the antenna 327 and may be configured to transmit and/or receive radio signals in at least one predetermined frequency band via the antenna 327. According to an embodiment, in the state in which the second housing 320 is slid in, at least a portion of the flexible display 330 may affect the radiation performance of the antenna 327 since at least a portion of the flexible display 330 is accommodated into the first space 3101 of the first housing 310 and/or the second housing 320 and located in the vicinity of the antenna 327.

According to various embodiments, the electronic device 300 may include a conductive connection member 340 disposed between the substrate 325 and the conductive plate 3311 in the vicinity of the antenna 327. According to an embodiment, the conductive connection member 340, which electrically interconnects the conductive plate 3311 and the ground G of the substrate 325 via at least a portion of the support member 326, may be helpful for improving radiation performance and/or changing the operating frequency band of the antenna 327.

Figure 15A:
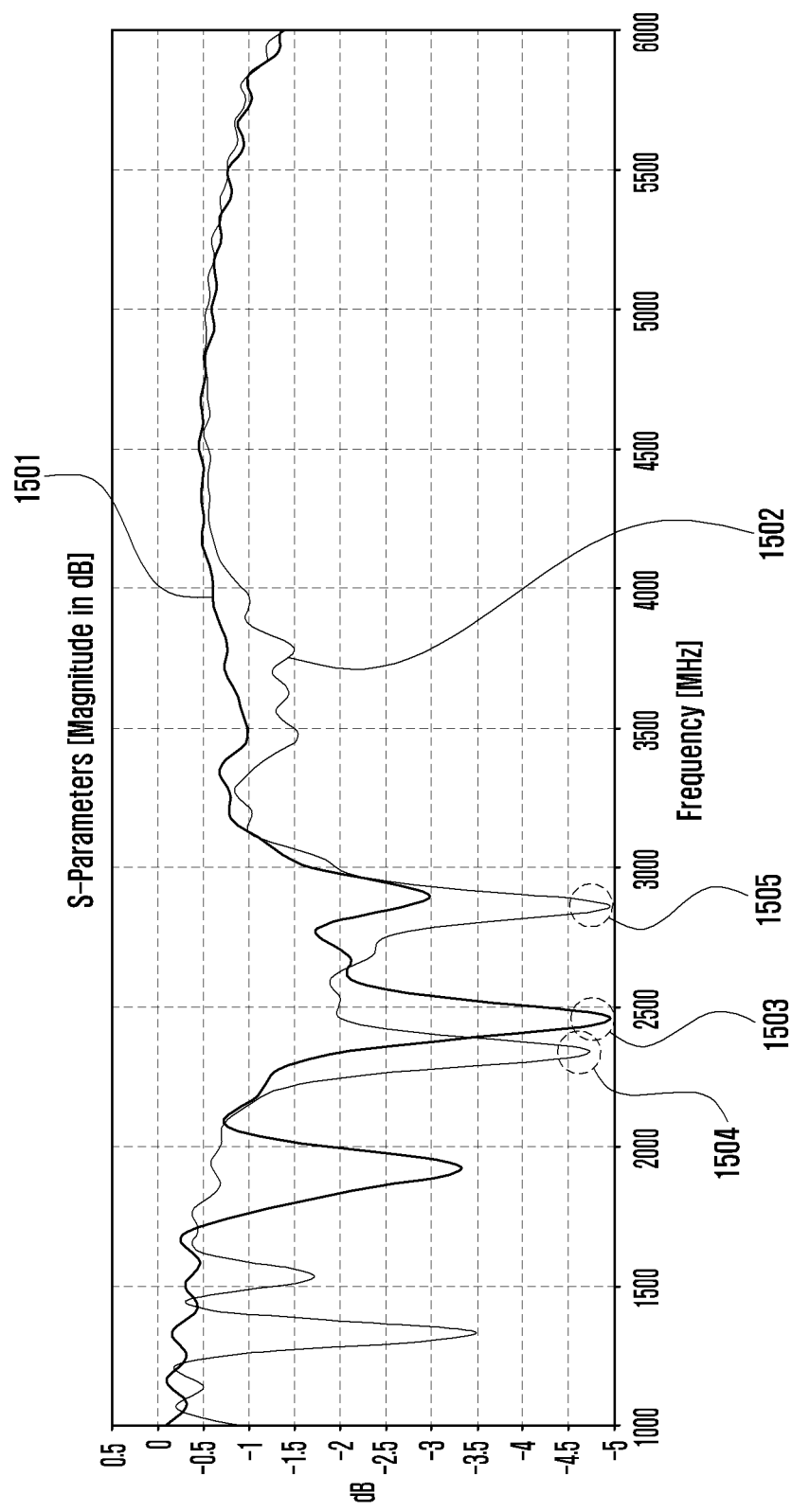
FIGS. 15A and 15B are diagrams illustrating, in comparison, radiation patterns of antennas depending on whether electrical connection between the conductive plate of the display of FIG. 14 and a substrate ground is present or not according to various embodiments of the disclosure.
Figure 15B:
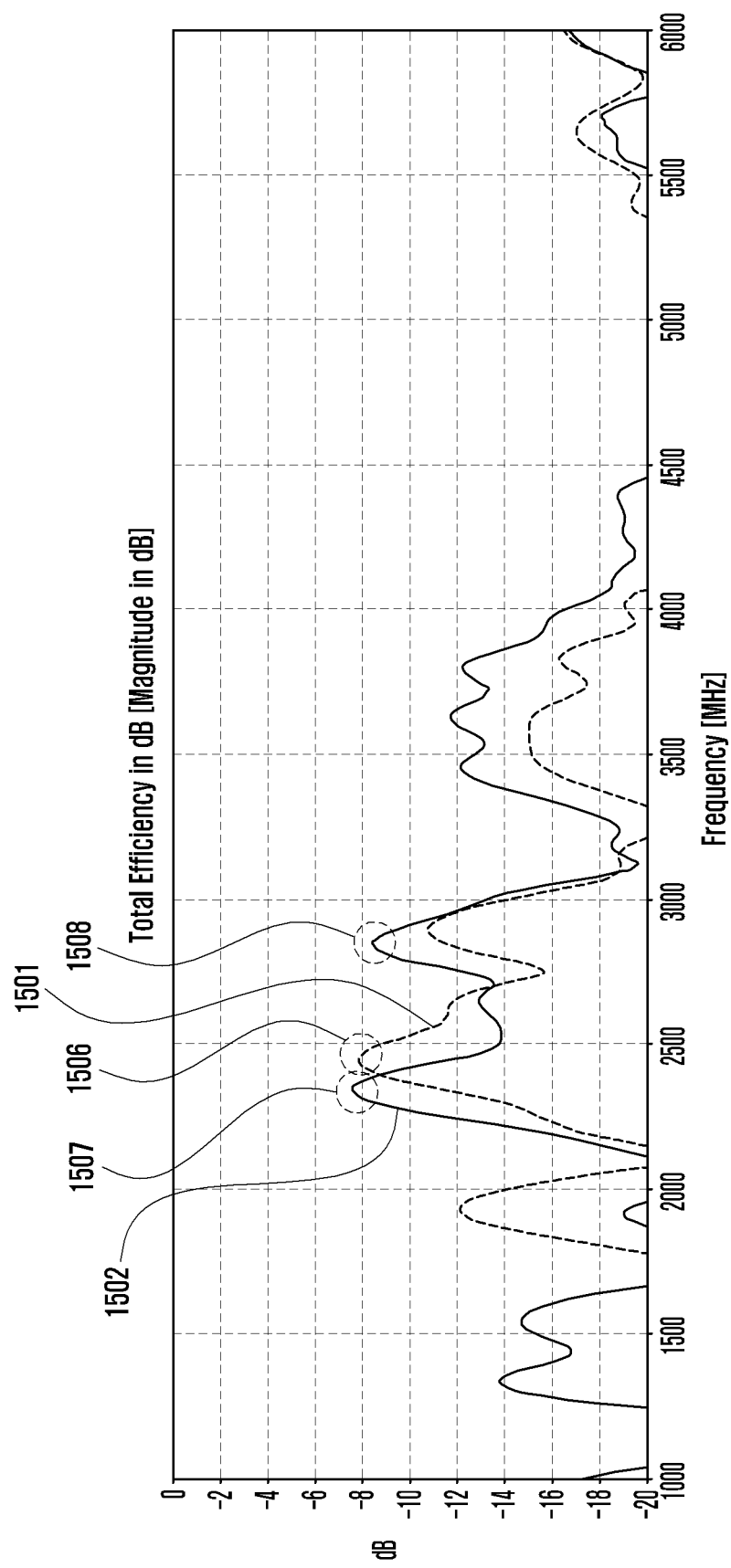

FIGS. 15A and 15B are diagrams illustrating, in comparison, radiation patterns of antennas depending on whether electrical connection between the conductive plate of the display of FIG. 14 and a substrate ground is present or not according to various embodiments of the disclosure.

Referring to FIGS. 15A and 15B, it can be seen that, when the conductive plate 3311 and the ground G of the substrate 325 are not electrically connected to each other (graph 1501), the antenna 327 operates in one operating frequency band (the area 1503 of FIG. 15A and the area 1506 of FIG. 15B), whereas, when the conductive plate 3311 and the ground G of the substrate 325 are electrically connected to each other via the conductive connection member 340 (graph 1502), the antenna 327 operates in two operating frequency bands (the areas 1504 and 1505 in FIG. 15A and the areas 1507 and 1508 in FIG. 15B). This may mean that, by connecting the conductive plate 3311 and the ground (G) of the substrate 325 in the vicinity of the antenna 347 via the conductive connection member 340, radiation performance is improved such that the antenna 327 operates in at least two operating frequency bands.

Figure 16A:
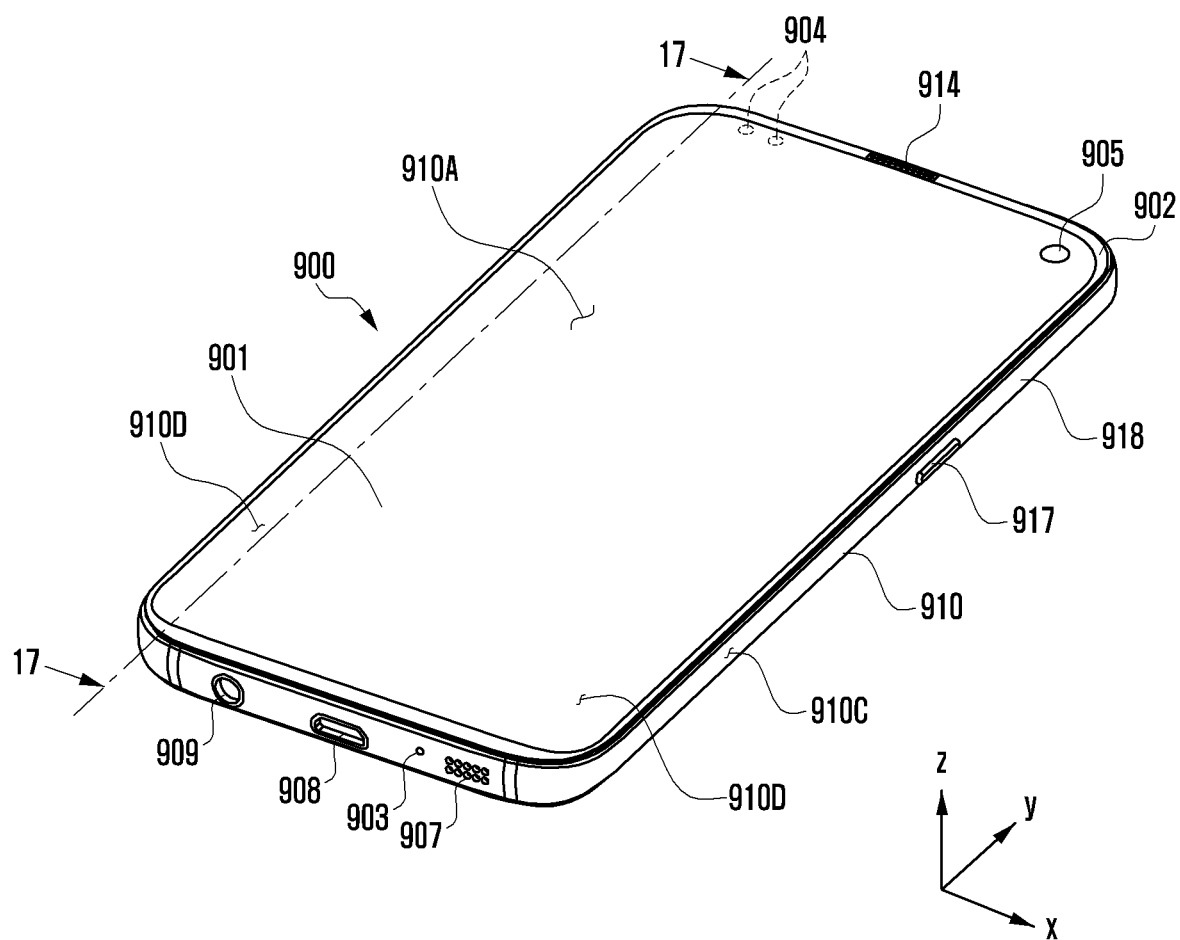
FIG. 16A is a front perspective view illustrating an electronic device according to an embodiment of the disclosure.

FIG. 16A illustrates a perspective view showing a front surface of a mobile electronic device according to an embodiment of the disclosure.

Figure 16B:
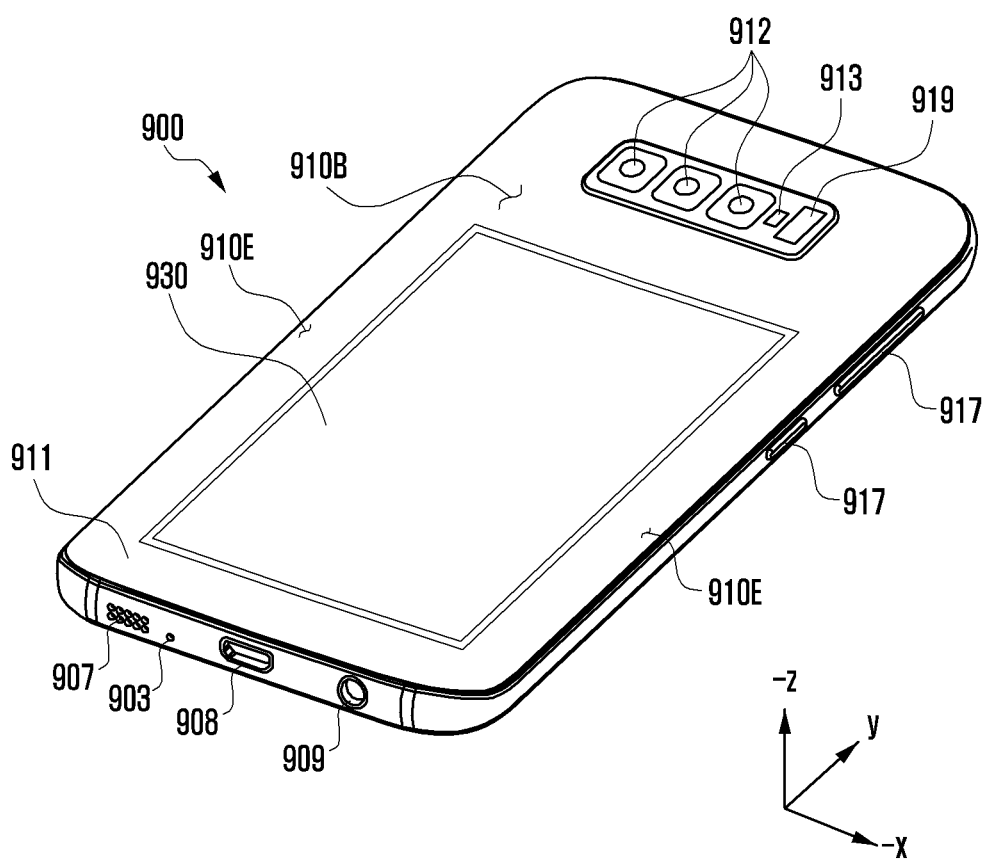
FIG. 16B is a rear perspective view of the electronic device according to an embodiment of the disclosure.

FIG. 16B illustrates a perspective view showing a rear surface of the mobile electronic device shown in FIG. 16A according to an embodiment of the disclosure.

Referring to FIGS. 16A and 16B, a mobile electronic device 900 may include a housing 910 that includes a first surface (or front surface) 910A, a second surface (or rear surface) 910B, and a lateral surface 910C that surrounds a space between the first surface 910A and the second surface 910B. The housing 910 may refer to a structure that forms a part of the first surface 910A, the second surface 910B, and the lateral surface 910C. The first surface 910A may be formed of a front plate 902 (e.g., a glass plate or polymer plate coated with a variety of coating layers) at least a part of which is substantially transparent. The second surface 910B may be formed of a rear plate 911 which is substantially opaque. The rear plate 911 may be formed of, for example, coated or colored glass, ceramic, polymer, metal (e.g., aluminum, stainless steel (STS), or magnesium), or any combination thereof. The lateral surface 910C may be formed of a lateral bezel structure (or "lateral member") 918 which is combined with the front plate 902 and the rear plate 911 and includes a metal and/or polymer. The rear plate 911 and the lateral bezel structure 918 may be integrally formed and may be of the same material (e.g., a metallic material such as aluminum).

The front plate 902 may include two first regions 910D disposed at long edges thereof, respectively, and bent and extended seamlessly from the first surface 910A toward the rear plate 911. Similarly, the rear plate 911 may include two second regions 910E disposed at long edges thereof, respectively, and bent and extended seamlessly from the second surface 910B toward the front plate 902. The front plate 902 (or the rear plate 911) may include only one of the first regions 910D (or of the second regions 910E). The first regions 910D or the second regions 910E may be omitted in part. When viewed from a lateral side of the mobile electronic device 900, the lateral bezel structure 918 may have a first thickness (or width) on a lateral side where the first region 910D or the second region 910E is not included, and may have a second thickness, being less than the first thickness, on another lateral side where the first region 910D or the second region 910E is included.

The mobile electronic device 900 may include at least one of a display 901, audio modules 903, 907 and 914, sensor modules 904 and 919, camera modules 905, 912 and 913, a key input device 917, a light emitting device, and connector holes 908 and 909. The mobile electronic device 900 may omit at least one (e.g., the key input device 917 or the light emitting device) of the above components, or may further include other components.

The display 901 may be exposed through a substantial portion of the front plate 902, for example. At least a part of the display 901 may be exposed through the front plate 902 that forms the first surface 910A and the first region 910D of the lateral surface 910C. The display 901 may be combined with, or adjacent to, a touch sensing circuit, a pressure sensor capable of measuring the touch strength (pressure), and/or a digitizer for detecting a stylus pen. At least a part of the sensor modules 904 and 919 and/or at least a part of the key input device 917 may be disposed in the first region 910D and/or the second region 910E.

The audio modules 903, 907 and 914 may correspond to a microphone hole 903 and speaker holes 907 and 914, respectively. The microphone hole 903 may contain a microphone disposed therein for acquiring external sounds and, in a case, contain a plurality of microphones to sense a sound direction. The speaker holes 907 and 914 may be classified into an external speaker hole 907 and a call receiver hole 914. The microphone hole 903 and the speaker holes 907 and 914 may be implemented as a single hole, or a speaker (e.g., a piezo speaker) may be provided without the speaker holes 907 and 914.

The sensor modules 904 and 919 may generate electrical signals or data corresponding to an internal operating state of the mobile electronic device 900 or to an external environmental condition. The sensor modules 904 and 919 may include a first sensor module 904 (e.g., a proximity sensor) and/or a second sensor module (e.g., a fingerprint sensor) disposed on the first surface 910A of the housing 910, and/or a third sensor module 919 (e.g., a heart rate monitor (HRM) sensor) and/or a fourth sensor module (e.g., a fingerprint sensor) disposed on the second surface 910B of the housing 910. The fingerprint sensor may be disposed on the second surface 910B as well as the first surface 910A (e.g., the display 901) of the housing 910. The electronic device 900 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 905, 912 and 913 may include a first camera device 905 disposed on the first surface 910A of the electronic device 900, and a second camera device 912 and/or a flash 913 disposed on the second surface 910B. The camera module 905 or the camera module 912 may include one or more lenses, an image sensor, and/or an image signal processor. The flash 913 may include, for example, a light emitting diode or a xenon lamp. Two or more lenses (infrared cameras, wide angle and telephoto lenses) and image sensors may be disposed on one side of the electronic device 900.

The key input device 917 may be disposed on the lateral surface 910C of the housing 910. The mobile electronic device 900 may not include some or all of the key input device 917 described above, and the key input device 917 which is not included may be implemented in another form such as a soft key on the display 901. The key input device 917 may include the sensor module disposed on the second surface 910B of the housing 910.

The light emitting device may be disposed on the first surface 910A of the housing 910. For example, the light emitting device may provide status information of the electronic device 900 in an optical form. The light emitting device may provide a light source associated with the operation of the camera module 905. The light emitting device may include, for example, a light emitting diode (LED), an IR LED, or a xenon lamp.

The connector holes 908 and 909 may include a first connector hole 908 adapted for a connector (e.g., a universal serial bus (USB) connector) for transmitting and receiving power and/or data to and from an external electronic device, and/or a second connector hole 909 adapted for a connector (e.g., an earphone jack) for transmitting and receiving an audio signal to and from an external electronic device.

Some sensor modules 905 of camera modules 905 and 912, some sensor modules 904 of sensor modules 904 and 919, or an indicator may be arranged to be exposed through a display 901. For example, the camera module 905, the sensor module 904, or the indicator may be arranged in the internal space of an electronic device 900 so as to be brought into contact with an external environment through an opening of the display 901, which is perforated up to a front plate 902. In another embodiment, some sensor modules 904 may be arranged to perform their functions without being visually exposed through the front plate 902 in the internal space of the electronic device. For example, in this case, an area of the display 901 facing the sensor module may not require a perforated opening.

According to various embodiments, the electronic device 900 may include a sub-display 930 (e.g., the second display) disposed to be visible from the outside through at least a portion of the rear surface plate 911. According to an embodiment, while power consumption is minimized in the state in which the display 901 of the electronic device 900 is inactive, the sub-display 930 may be activated to perform relatively simple functions of the electronic device 900.

Figure 17:
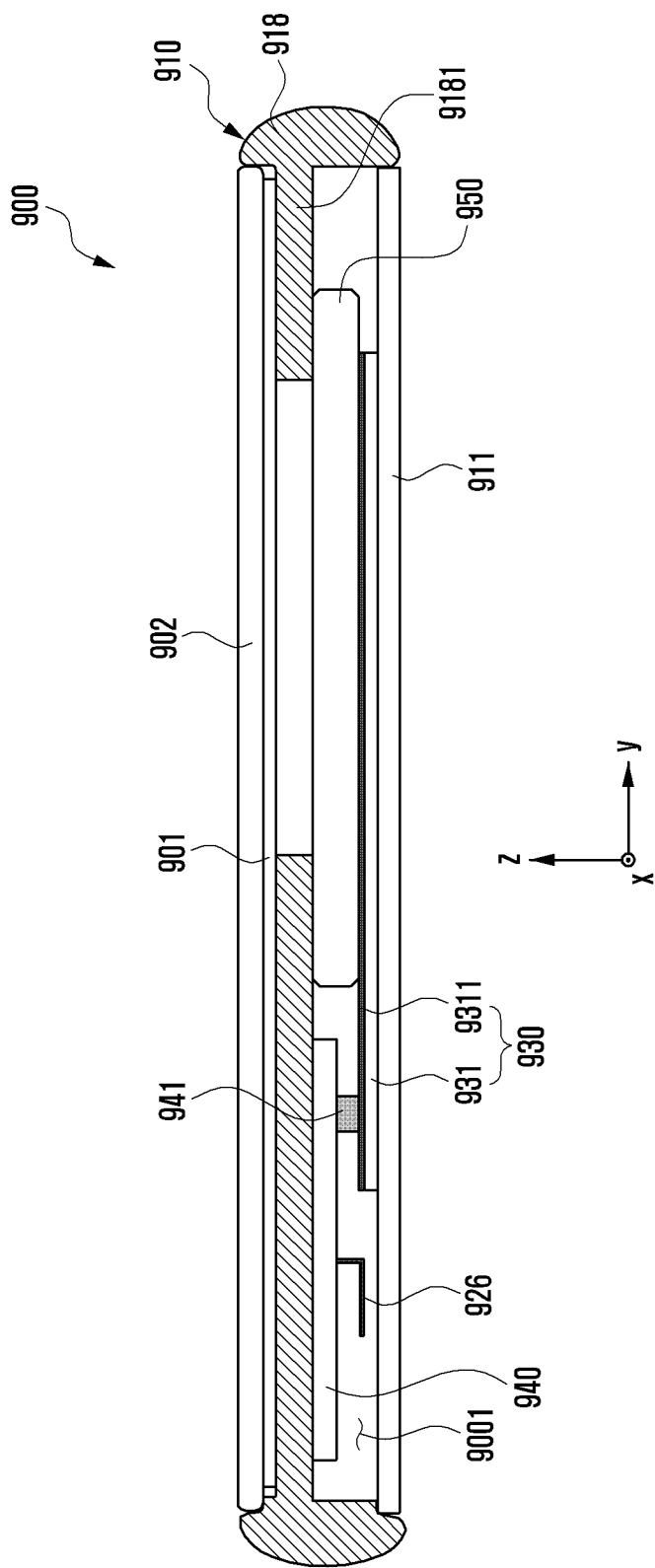
FIG. 17 is a cross-sectional view of the electronic device, taken along line 17-17 of FIG. 16A according to an embodiment of the disclosure.

FIG. 17 is a cross-sectional view of the electronic device 900 taken along line 17-17 of FIG. 16A according to an embodiment of the disclosure.

Referring to FIG. 17, the electronic device 900 may include a housing 910 including a front surface plate 902, a rear surface plate 911 facing the opposite direction to the front surface plate 902, and/or a side surface plate 918 surrounding an inner space 9001 of the front surface plate 902 and the rear surface plate 911. According to an embodiment, the electronic device 900 may include a support member 9181 disposed in the inner space 9001 and extending from the lateral member 920 or structurally coupled to the lateral member 920. According to an embodiment, the electronic device 900 may include a display 901 (e.g., the first display) disposed to be supported by the support member 9181. According to an embodiment, the display 901 may be disposed to be visible from the outside at least partially through the front surface plate 902. According to an embodiment, the electronic device 900 may include a battery 950 disposed the support member 9181 and a rear surface plate 911 in the inner surface 9001 of the electronic device 900.

According to various embodiments, the electronic device 900 may include a sub-display 930 (e.g., the second display) disposed in the inner space 9001 to be visible from the outside through at least a portion of the rear surface plate 911. According to an embodiment, the sub-display 930 may be disposed to at least partially overlap the display 901 when the rear surface plate 911 is viewed from above. According to an embodiment, the sub-display 930 may include a display panel 931 and a conductive plate 9311 (e.g., the conductive plate 444 in FIG. 4) stacked on the rear surface of the display panel 931.

According to various embodiments, the electronic device 900 may include a substrate 940 disposed in the inner space 9001 and an antenna 926 disposed in the vicinity of the substrate 940. According to an embodiment, the substrate 940 may include a wireless communication circuit (e.g., the wireless communication circuit F of FIG. 6A). According to an embodiment, the wireless communication circuit F may be electrically connected to the antenna 926 and may be configured to transmit and/or receive radio signals in at least one predetermined frequency band via the antenna 926. According to an embodiment, the electronic device 900 may include a conductive connection member 941 disposed between the substrate 940 and the conductive plate 3311 in the vicinity of the antenna 926. According to an embodiment, the conductive connection member 941, which electrically interconnects the conductive plate 9311 and the ground G of the substrate 940, may be helpful for improving radiation performance and/or changing the operating frequency band of the antenna 926.

According to various embodiments, an electronic device (e.g., the electronic device 200 in FIG. 2A) may include: a first housing (e.g., the first housing 210 in FIG. 2A) including a first surface (e.g., the first surface 211 in FIG. 2A), a second surface (e.g., second surface 212 in FIG. 2A) facing an opposite direction to the first surface, and a first lateral member (e.g., the first lateral member 213 in FIG. 2A) surrounding a first space between the first surface and the second surface; a second housing (e.g., the second housing 220 in FIG. 2A) foldably connected to the first housing via a hinge device (e.g., the hinge device 264 in FIG. 3) and including a third surface (e.g., the third surface in FIG. 2A) and a fourth surface (e.g., the fourth surface 222 in FIG. 2A), which, in an unfolded state, face the same direction as the first surface and an opposite direction to the third surface, respectively, and a second side surface (e.g., the second side surface 223 in FIG. 2A) surrounding a second space between the third surface and the fourth surface; a first display (e.g., the first display 230 in FIG. 2A) extending from the first surface to at least a portion of the third surface and disposed to be bendable; a second display (e.g., the second display 400 in FIG. 2A) disposed to be visible from the outside through the fourth surface and including a conductive plate (e.g., the conductive plate 444 in FIG. 4) on the rear surface thereof; an antenna disposed in the second housing (e.g., the conductive portion 5211 in FIG. 6A); a wireless communication circuit (e.g., the wireless communication circuit F in FIG. 6A) electrically connected to the antenna via a first electrical path (e.g., the first electrical path 5301 in FIG. 6A) at a first point (e.g., the first point L1 in FIG. 6A) in the second space; and at least one conductive connection member (e.g., the conductive connection member 540 of FIG. 6A) disposed in the second space and electrically connected to the ground. The conductive plate may be electrically connected to the ground at a second point (e.g., the second point L2 in FIG. 6A) spaced apart from the first point via the conductive connection member.

According to various embodiments, the second point may be disposed to have an electrical length of up to $\lambda/2$ from the first point.

According to various embodiments, the electronic device may further include a conductive structure disposed in the second housing and electrically connected to the ground, and the conductive plate may be electrically connected to the conductive structure via the at least one conductive connection member.

According to various embodiments, the conductive structure may include at least one of a substrate electrically connected to the ground, a shield can, a camera module, a speaker device, a receiver device, a sensor module, a socket device, or a connector module.

According to various embodiments, the conductive structure may include a substrate, and the electronic device may further include a variable circuit disposed in a second electrical path between the ground of the substrate and the conductive plate.

According to various embodiments, the variable circuit may include: a plurality of passive elements having different element values; and a switch configured to electrically connect the ground of the substrate and the conductive plate via one of the plurality of passive elements.

According to various embodiments, the electronic device may further include at least one processor operatively connected to the switch, and the processor may be configured to control the switch based on state information of the electronic device.

According to various embodiments, the conductive connection member may include at least one of a conductive clip (C-clip), a conductive tape, and a conductive gasket.

According to various embodiments, a radiation characteristic of the antenna may be determined based on the separation distance from the first point to the second point.

According to various embodiments, a radiation characteristic of the antenna may be determined based on an electrical connection area between the conductive plate and the at least one conductive connection member at the second point.

According to various embodiments, a radiation characteristic of the antenna may be determined based on the number of at least one conductive connection member electrically connected to the conductive plate at the second point.

According to various embodiments, the antenna may include at least one conductive portion disposed by a non-conductive portion disposed on at least a portion of the lateral member.

According to various embodiments, at least a portion of the conductive portion may configure the exterior of the electronic device.

According to various embodiments, the antenna may include at least one of an LDS pattern provided on an antenna carrier disposed near the first point or a conductive pattern provided on a substrate in an inner space of the second housing.

According to various embodiments, the wireless communication circuit may be configured to transmit or receive a radio signal in a low band, a mid-band, a high band or a sub-6 band via the antenna.

According to various embodiments, an electronic device may include: a housing including a first surface and a second surface facing an opposite direction to the first surface; a first display disposed in an inner space of the housing to be visible from the outside through the first surface; a second display that at least partially overlaps the first display when viewed from above, the second display including a conductive plate on a rear surface thereof and being disposed to be visible from the outside through the second surface; an antenna disposed in and/or near an overlapping space between the first display and the second display; a wireless communication circuit electrically connected to the antenna via a first electrical path at a first point in the inner space; and at least one conductive connection member disposed in the inner space of the housing and connected to a ground. The conductive plate may be electrically connected to the ground at a second point spaced apart from the first point via the conductive connection member.

According to various embodiments, the second point may be disposed to have an electrical length of up to $\lambda/2$ from the first point.

According to various embodiments, a radiation characteristic of the antenna may be determined based on the separation distance from the first point to the second point.

According to various embodiments, a radiation characteristic of the antenna may be determined based on an electrical connection area between the conductive plate and the at least one conductive connection member at the second point.

According to various embodiments, a radiation characteristic of the antenna may be determined based on the number of at least one conductive connection member electrically connected to the conductive plate at the second point.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing comprising a first surface, a second surface facing an opposite direction to the first surface, and a first lateral member surrounding a first space between the first surface and the second surface;
   a second housing foldably connected to the first housing via a hinge device and comprising a third surface facing a same direction as the first surface in an unfolded state, a fourth surface facing an opposite direction to the third surface, and a second lateral member surrounding a second space between the third surface and the fourth surface;
   a first display extending from the first surface to at least a portion of the third surface and disposed to be bendable;
   a second display disposed to be visible from outside through the fourth surface and comprising a conductive plate on a rear surface thereof;
   an antenna disposed in the second housing;
   a wireless communication circuit electrically connected to the antenna via a feed at a first point in the second space; and
   at least one conductive connection member disposed in the second space and electrically connected to a ground,
   wherein the conductive plate is electrically connected to the ground at a second point spaced apart from the first point via the at least one conductive connection member, and
   wherein the at least one conductive connection member is disposed between the first display and the second display in the second space of the second housing.

2. The electronic device of claim 1,
   wherein the second point is disposed to have an electrical length of up to $\lambda/2$ from the first point, and
   wherein $\lambda/2$ corresponds to half a wavelength of a signal frequency at which the antenna operates.

3. The electronic device of claim 1, further comprising:
   a conductive structure disposed in the second housing and electrically connected to the ground,
   wherein the conductive plate is electrically connected to the conductive structure via the at least one conductive connection member.

4. The electronic device of claim 3, wherein the conductive structure comprises at least one of a substrate electrically connected to the ground, a shield can, a camera module, a speaker device, a receiver device, a sensor module, a socket device, or a connector module.

5. The electronic device of claim 3,
   wherein the conductive structure comprises a substrate, and p1 wherein the electronic device further comprises:
   a variable circuit disposed in a second electrical path between a ground of the substrate and the conductive plate.

6. The electronic device of claim 5, wherein the variable circuit comprises:
   a plurality of passive elements having different element values; and
   a switch configured to electrically connect the ground of the substrate and the conductive plate via one of the plurality of passive elements.

7. The electronic device of claim 6, further comprising:
   at least one processor operatively connected to the switch,
   wherein the at least one processor is configured to control the switch based on state information of the electronic device.

8. The electronic device of claim 1, wherein the at least one conductive connection member comprises at least one of a conductive clip (C-clip), a conductive tape, or a conductive gasket.

9. The electronic device of claim 1, wherein a radiation characteristic of the antenna is determined based on a separation distance from the first point to the second point.

10. The electronic device of claim 1, wherein a radiation characteristic of the antenna is determined based on an electrical connection area between the conductive plate and the at least one conductive connection member at the second point.

11. The electronic device of claim 1, wherein a radiation characteristic of the antenna is determined based on a number of the at least one conductive connection member electrically connected to the conductive plate at the second point.

12. The electronic device of claim 1, wherein the antenna comprises at least one conductive portion disposed by a non-conductive portion disposed on at least a portion of the first lateral member.

13. The electronic device of claim 12, wherein at least a portion of the conductive portion configures an exterior of the electronic device.

14. The electronic device of claim 1, wherein the antenna comprises at least one of a laser direct structuring (LDS) pattern provided on an antenna carrier disposed near the first point or a conductive pattern provided on a substrate in an inner space of the second housing.

15. The electronic device of claim 1, wherein the wireless communication circuit is configured to transmit or receive a radio signal in a low band, a mid-band, a high band, or a sub-6 band, via the antenna.

16. An electronic device comprising:
   a housing including a first surface and a second surface facing an opposite direction to the first surface;
   a first display disposed in an inner space of the housing to be visible from the outside through the first surface;
   a second display that at least partially overlaps the first display when viewed from above, the second display including a conductive plate on a rear surface thereof and being disposed to be visible from the outside through the second surface;
   an antenna disposed in and/or near an overlapping space between the first display and the second display;
   a wireless communication circuit electrically connected to the antenna via a feed at a first point in the inner space; and
   at least one conductive connection member disposed in the inner space of the housing and connected to a ground,
   wherein the conductive plate is electrically connected to the ground at a second point spaced apart from the first point via the at least one conductive connection member, and
   wherein the at least one conductive connection member is disposed between the first display and the second display in the inner space of the housing.

17. The electronic device of claim 16,
wherein the second point is disposed to have an electrical length of up to $\lambda/2$ from the first point, and
wherein $\lambda/2$ corresponds to half a wavelength of a signal frequency at which the antenna operates.

18. The electronic device of claim 16, wherein a radiation characteristic of the antenna is determined based on a separation distance from the first point to the second point.

19. The electronic device of claim 16, wherein a radiation characteristic of the antenna is determined based on an electrical connection area between the conductive plate and the at least one conductive connection member at the second point.

20. The electronic device of claim 16, wherein a radiation characteristic of the antenna is determined based on a number of the at least one conductive connection member electrically connected to the conductive plate at the second point.

* * * * *